(12) United States Patent
Maruoka

(10) Patent No.: US 6,765,686 B2
(45) Date of Patent: Jul. 20, 2004

(54) IMAGE PROCESSING APPARATUS, METHOD OF CONTROLLING SAME, AND IMAGE PROCESSING SYSTEM

(75) Inventor: Hiroshi Maruoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/190,097

(22) Filed: Nov. 12, 1998

(65) Prior Publication Data

US 2003/0137680 A1 Jul. 24, 2003

(30) Foreign Application Priority Data

Nov. 14, 1997 (JP) .............................................. 9-314090
Oct. 22, 1998 (JP) ........................................... 10-301298

(51) Int. Cl.[7] .......................... B41B 17/00; B41F 27/00; G06F 15/00; G06K 1/00
(52) U.S. Cl. .................. 358/1.15; 358/909.1; 358/906; 358/302; 358/296; 358/1.13; 358/1.15; 358/1.16; 347/2; 348/207; 348/232; 348/233; 348/231; 399/84; 399/82
(58) Field of Search .............................. 358/909.1, 906, 358/302, 296, 1.13, 1.15, 1.16; 347/2; 348/207, 232, 233, 231; 399/84, 82

(56) References Cited

U.S. PATENT DOCUMENTS

| | | | | |
|---|---|---|---|---|
| 4,837,628 A | * | 6/1989 | Sasaki | 348/220 |
| 4,887,161 A | * | 12/1989 | Watanabe et al. | 348/233 |
| 4,888,648 A | * | 12/1989 | Takeuchi et al. | 358/906 |
| 4,975,736 A | * | 12/1990 | Kito et al. | 355/35 |
| 5,018,017 A | * | 5/1991 | Sasaki et al. | 348/232 |
| 5,477,264 A | * | 12/1995 | Sarbadhikari et al. | 348/231 |
| 5,493,409 A | * | 2/1996 | Maeda et al. | 347/218 |
| 5,606,420 A | * | 2/1997 | Maeda et al. | 355/21 |
| 5,913,019 A | * | 6/1999 | Attenberg | 358/1.18 |
| 6,075,623 A | * | 6/2000 | Yun | 358/486 |
| 6,184,999 B1 | * | 2/2001 | Yoshida et al. | 358/1.16 |
| 6,185,000 B1 | * | 2/2001 | Shiota et al. | 358/1.18 |
| 6,188,430 B1 | * | 2/2001 | Motai | 347/107 |
| 6,441,854 B2 | * | 8/2002 | Fellegara et al. | 348/333.13 |

FOREIGN PATENT DOCUMENTS

EP  0550837 A1  *  8/1992  ........... G03B/27/46

OTHER PUBLICATIONS

Fellegra et al., Electronic Camera with Quick Review of Last Captured Image.*

* cited by examiner

Primary Examiner—Edward Coles
Assistant Examiner—Ashanti Ghee
(74) Attorney, Agent, or Firm—Fitzpatrick, Cella, Harper & Scinto

(57) ABSTRACT

Image data is stored on a removable external card together with previous printing information relating to printing of this image data. Accordingly, when printing identical with that executed previously is carried out, the need to make printing settings again is eliminated by performing printing based upon the stored information. By further storing printing paper information in the external card, information regarding a new type of printing paper can be registered in an image processing apparatus with ease. This makes it possible for the apparatus to print properly even on a new type of paper.

51 Claims, 26 Drawing Sheets

FIG. 3

| |
|---|
| PAPER NUMBER |
| LAYOUT NUMBER |
| NUMBER OF PRINTS |
| TOTAL NUMBER OF PHOTOGRAPHS (=n) |
| PHOTOGRAPH NUMBER 1 |
| PHOTOGRAPH EFFECT NUMBER 1 |
| ⋮ |
| PHOTOGRAPH NUMBER n |
| PHOTOGRAPH EFFECT NUMBER n |

FIG. 15

| PAPER NUMBER |
| --- |
| LAYOUT NUMBER |
| NUMBER OF PRINTS |
| INDEX NUMBER |
| INDEX ITEM NUMBER |
| TOTAL NUMBER OF PHOTOGRAPHS (=n) |
| PHOTOGRAPH NUMBER 1 |
| PHOTOGRAPH EFFECT NUMBER 1 |
| PHOTOGRAPHY DATE 1 |

⋮

| PHOTOGRAPH NUMBER n |
| --- |
| PHOTOGRAPH EFFECT NUMBER n |
| PHOTOGRAPHY DATE n |

FIG. 18

| LATEST PRINTING DATE | LAYOUT NAME | PAPER NAME |
|---|---|---|
| YYYY/MMM/DD HH : MM | CCCCCCCCCCCC | PPPPPPPPP |
| ⋮ | ⋮ | ⋮ |

IMAGE PROCESSING APPARATUS, METHOD OF CONTROLLING SAME, AND IMAGE PROCESSING SYSTEM

BACKGROUND OF THE INVENTION

This invention relates to an image processing apparatus, a method of controlling the same and an image processing system. More particularly, the invention relates to an image processing apparatus for printing out an image that has been stored in a storage device, a method of controlling this apparatus and an image processing system.

Recent progress in image processing technology has made it possible not only to select printing paper and set the number of sheets printed out in a conventional printing apparatus but also to subject image data to a variety of image processing operations such as scaling, color conversion, trimming and masking and then print out the data on printing paper. It has also become possible to select many types of image quality for output images, ranging from high-detail output as in the manner of photographic images to draft output for the purpose of allowing recognition only of the general features of an image. In addition, sources of input of image data to be printed are not limited solely to image reading devices such as scanners and to computers, for it is possible to input image data that has been stored on a removable external storage device such as a memory card, and thus a variety of input modes can be selected.

Thus, printers have a greater number of executable functions and have become more complicated, as a result of which the setting these printers is more complex. In a conventional printing apparatus, therefore, the general practice is to treat the last stored setting as the effective setting as long as the power supply of the printing apparatus is not turned off. This makes it unnecessary for the user to make the same setting each time printing is performed. Another known printing apparatus stores various printing settings in a non-volatile RAM. This apparatus is such that even if the power supply is turned off, the last setting is made the effective setting the next time the power supply is turned on.

Further, it is possible to set the conventional printing apparatus to the type of printing paper, as mentioned above. That is, printout is possible after the optimum image processing has been applied to a selected printing paper. However, a wide variety of printing papers are now being provided owing to the diverse needs of users in recent years. This makes it necessary for conventional printers to support types of printing paper not included among the candidates the printer was originally designed to handle. The usual approach, therefore, is to have the user check the setting that is optimum for printing on a new printing paper selected from among the available candidates and then make the setting.

The conventional printing apparatus described above is such that when a user wishes to perform printing of certain image data in a manner the same as last time, the last setting naturally will be the effective setting if the current printing operation is performed immediately after the last printing of the image data. However, when the user wishes to perform printing the same as that executed previously but printing based upon another setting has been executed in between, it is required that the user reset the printing apparatus to establish the previous setting again.

For example, assume that a printing apparatus capable of printing out photographic image data is to perform a so-called "extra print" operation in which printing the same as that executed previously is to be carried out. If this operation for producing an extra print is performed after a different photographic image has been printed, then the user must again make settings exactly the same as before.

Further, in a case where printing is to be performed on a type of printing paper for which the printing apparatus was not originally designed to support, printing on the printing paper may not be possible and, even if printing is possible, satisfactory results may not always be obtained.

For example, with a printing apparatus that is capable of printing out photographic image data, consider a case where the apparatus is to print on a postcard, which is suited to ink-jet printing, not supported by the apparatus. Ink-jet printing paper usually is so-called coated paper that has been subjected to a special coating process that makes optimum printing by ink possible. If only "plain paper" and "glossy paper" can be set as types of paper in this printing apparatus that has been set to the "postcard" size printing paper, the user is constrained to select "glossy paper". As a result, it is not possible to obtain a printout of optimum image quality conforming to "coated paper" that is for ink-jet printing purposes.

SUMMARY OF THE INVENTION

Accordingly, it is an object of the present invention to provide an image processing apparatus, a method of controlling same and an image processing system in which image data and printing information relating to this image data are stored together in storage means, whereby printing information used the last time printing was performed can be made the effective information when the image data is printed.

According to the present invention, the foregoing object is attained by providing an image processing apparatus comprising printing means for printing out image data based upon printing information that has been set; image information holding means for holding image data and auxiliary information comprising printing information relating to this image data; and control means for performing control in such a manner that the auxiliary information is referred to as the printing information when image data held by the image information holding means is printed out by the printing means.

Another object of the present invention is to store printing paper information as the printing information and to make it possible to supply new printing paper information.

According to the present invention, the foregoing object is attained by providing an image processing apparatus wherein the image information holding means further holds, as second paper information, printing-paper type information indicating types of printing paper handled by the printing means, and printing control information regarding the printing paper; and the control means causes the second paper information to be held by the paper information holding means in a case where a plurality of items of first paper information are all different from the second paper information.

As a result, printing paper information concerning a type of paper not available as a candidate in the printing apparatus can be registered with ease and printing that is suited to this printing paper can be performed.

Another object of the present invention is to make possible management of the history of printing information.

According to the present invention, the foregoing object is attained by providing an image processing apparatus wherein the image information holding means holds a plurality of items of the auxiliary information as well as management information for managing the plurality of items of auxiliary information.

As a result, one desired item of printing information can be selected from among a plurality of items of printing information and printing can be carried out based upon the selected item of printing information.

Another object of the present invention is to make it possible to control whether or not to update the printing information.

According to the present invention, the foregoing object is attained by providing an image processing apparatus further comprising designating means for designating that updating of the auxiliary information is not allowed, wherein the control means does not perform updating of the auxiliary information in response to the designation by the designating means not allowing updating.

As a result, it is possible to prevent the updating of the printing information by an erroneous operation.

Another object of the present invention is to include red-eye correction information as the printing information.

According to the present invention, the foregoing object is attained by providing an image processing apparatus wherein the printing information includes red-eye correction information for subjecting the image data to a red-eye correction.

As a result, a red-eye correction the same as that which prevailed the last time printing was performed can be executed without a troublesome setting operation relating to the red-eye correction.

The invention is particularly advantageous since image data and printing information relating to this image data are stored in storage means and the printing information is made the effective printing information when the image data is printed, thereby making possible printing processing the same as that performed previously without requiring a troublesome printing setting operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing an example of the composition of a printing setting table according to first and third embodiments;

FIG. 15 is a diagram showing an example of the composition of a printing setting file in the second embodiment;

FIG. 18 is a diagram showing an example of a history view display in the second embodiment;

DESCRIPTION OF THE PREFERRED EMBODIMENTS

Preferred embodiments of the present invention will now be described in detail in accordance with the accompanying drawings.

<First Embodiment>

[Construction of Apparatus]

Figure 1:
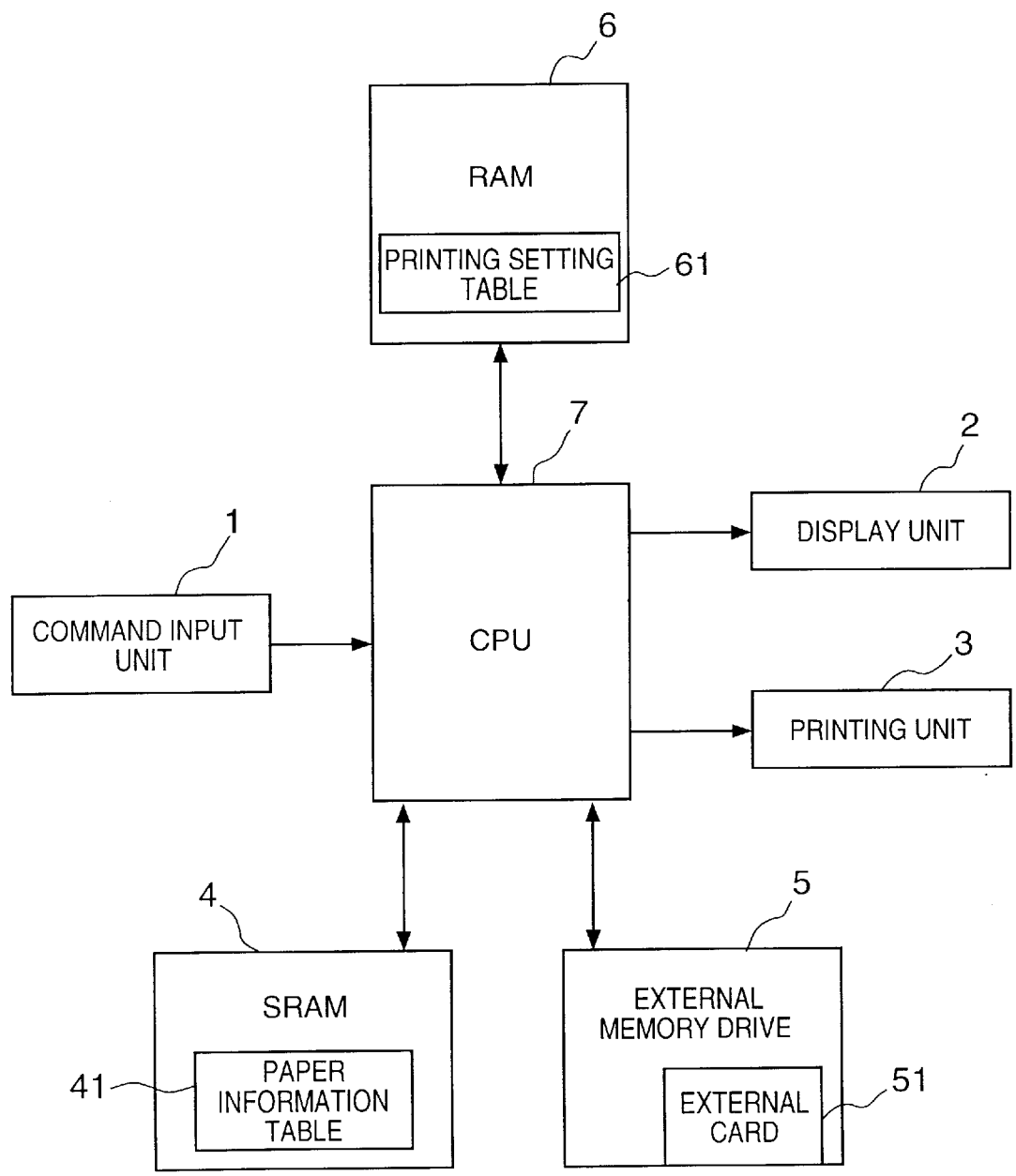
FIG. 1 is a block diagram showing the construction of an image processing apparatus according to an embodiment of the present invention.

FIG. 1 is a block diagram showing the construction of an image processing apparatus according to an embodiment of the present invention. The apparatus shown in FIG. 1 includes an instruction input unit 1 comprising buttons or and the like for entering print command information and recovery command information; a display unit 2 comprising an LCD display or LED display, etc., an SRAM 4 for storing the program of a processing procedure and a paper information table 41, etc., described later, the SRAM comprising a freely readable and writable memory the stored content of which is retained even if power is cut off; and an external memory drive 5 that makes it possible to load a non-volatile memory card or hard disk card (referred to as an "external card" below) 51. The program of the processing procedure, described later, may be stored on the external card 51 loaded in the external memory drive 5. The external card 51 stores a plurality of photographic image files. The apparatus further includes a RAM 6 comprising a freely readable and writable memory. A printing setting table 61, which is created within the RAM 6, stores various items of setting information necessary for the apparatus to execute printing processing.

The apparatus has a central processing unit (CPU) 7. The program used in this embodiment is stored in the SRAM 4, on the external card 51 loaded in the external memory drive 5 or in the RAM 6. The CPU 7 performs predetermined processing, described later, by reading out the program sequentially and executing the same.

In the image processing apparatus according to this embodiment, it is possible for a photograph file that has been stored on the external card 51 to be printed out in accordance with a predetermined layout. A characterizing feature of the apparatus is that detailed printing information is set for each external card at such time.

[Printing Processing]

Figure 2:
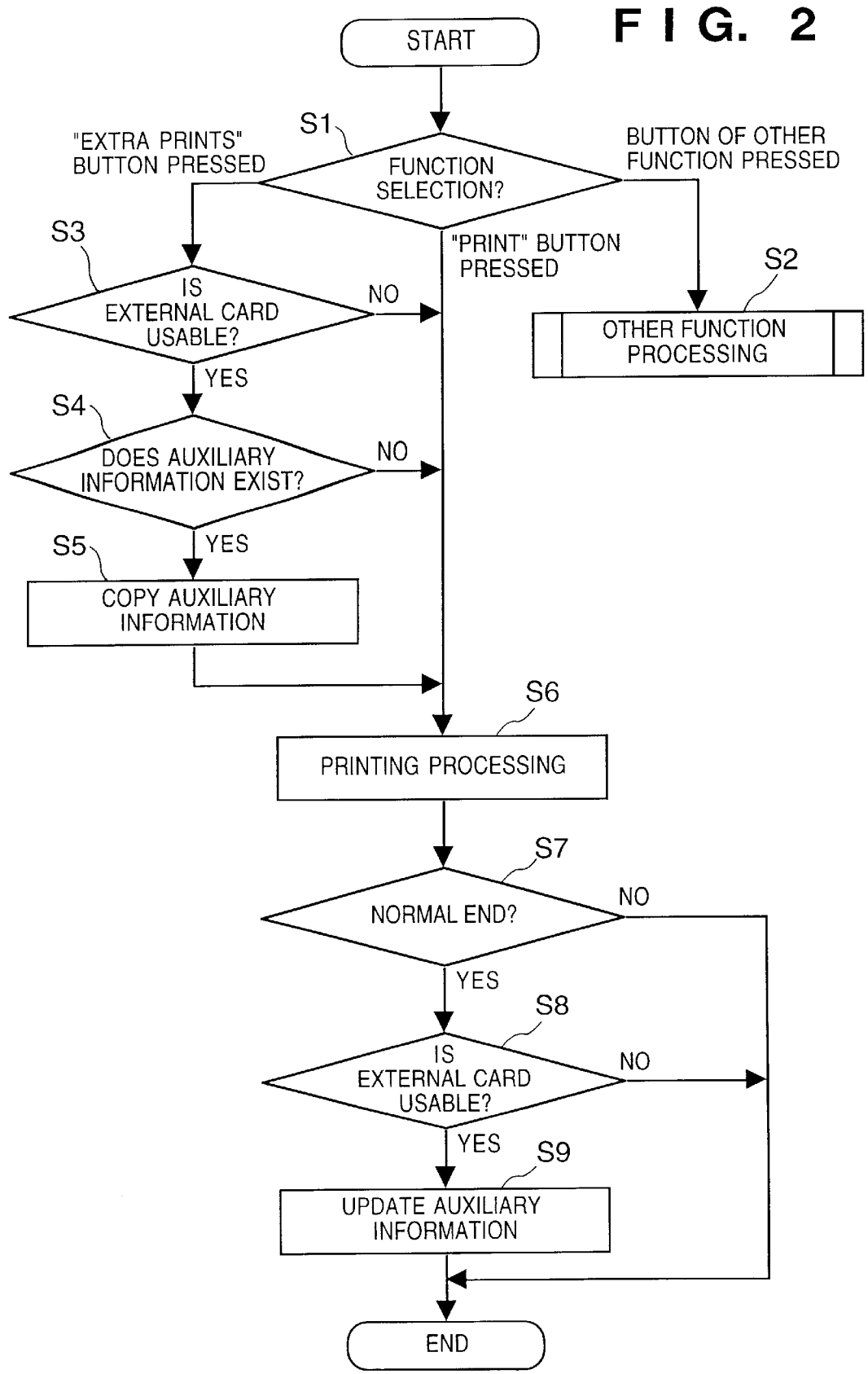
FIG. 2 is a flowchart illustrating printing processing according to this embodiment.

FIG. 2 is a flowchart illustrating printing processing in the image processing apparatus according to this embodiment. The details of operation that characterize this embodiment will now be described with reference to this flowchart.

When a power supply (not shown) is turned on, the apparatus executes various initialization processing operations and then waits for a command from the instruction input unit 1. One example of this initialization processing involves acquiring an area for the printing setting table 61 in the RAM 61 and executing initialization. The printing setting table 61 is an area for storing various items of setting information needed for execution of printing processing by the apparatus.

FIG. 3 illustrates an example of the composition of the printing setting table 61. Each element in the printing setting table 61 is initialized. Specifically, "paper number" is initialized to "1", which indicates a postcard; "layout number" is initialized to "1", which indicates division into upper and lower halves; "number of prints" is initialized to "1"; "total number of photographs" is initialized to "2"; "photograph number 1" is initialized to "1", which indicates the first photographic image file; "photographic effect number 1" is initialized to "1", which indicates no effect; "photograph number 2" is initialized to "2", which indicates the second photographic image file; and "photographic effect number 2" is initialized to "1", which indicates no effect.

Since the number of photographs differs depending upon the layout, the printing setting table 61 is designed to be variable in length. In this embodiment, an area for the maximum number of photographic images handled by this apparatus is acquired in the RAM 6 in advance for the purpose of creating the printing setting table 61.

Since the printing setting table 61 is designed to have "paper number", "layout number" and "total number of photographs" elements, this embodiment is capable of providing both a single-photograph format, in which a single photograph is output on one sheet of paper, and an album format, in which a plurality of photographs are output on one sheet of paper. The format depends upon the type of layout.

Further, a print count flag for storing whether a number of prints has been specified is acquired in the RAM 6 and the content of this flag is initialized to "off".

Next, by pressing a prescribed button on the instruction input unit 1, information corresponding to the pressed button is input to the CPU 7. In order to process this input information, the CPU 7 shifts control to function selection processing in the prescribed program stored in the SRAM 4. This program corresponds to the flowchart of FIG. 2 and the function selection processing is the processing of step S1 in this flowchart. When control based upon this program ends, the apparatus again waits for a command from the instruction input unit 1.

The operation of the apparatus will be described based upon the flowchart shown in FIG. 2.

When control by the CPU 7 proceeds to the function selection processing of step S1, the CPU discriminates the type of button pressed on the instruction input unit 1. Control proceeds to step S3 if an "extra prints" button has been pressed and to step S6 if a "print" button has been pressed. If a button (the button of another function) other than the "extra print" or "print" button has been pressed, control proceeds to step S2, where processing for this other function is executed. The processing of this program is then terminated. The indication "extra prints" is a request for an identical printout again in regard to a photograph file for which printing has already been completed in accordance with a prescribed layout. More specifically, printing is performed once various settings for extra prints have been made exactly the same as those used the last time printing was performed. The "print" indication is for requesting any printout without specifically taking into account the printing conditions that prevailed the last time printing was performed.

If the "extra prints" button has been pressed at step S1, control proceeds to step S3, at which external card confirmation processing for determining whether the external card 51 is usable or not in the external memory drive 5 is executed. That is, the CPU determines whether the external card 51 has been loaded in the external memory drive 5 and, if the card has been loaded, whether it is usable in the apparatus. Control proceeds to step S4 if the external card 51 can be used and to step S6 if it cannot. External card formats usable in this apparatus are well-known formats such as the DOS format. Within an external card having such a format, data is managed in file units and file names and locations within the external card are managed by a directory. Since these formats are well known, they need not be described here.

Figure 4:
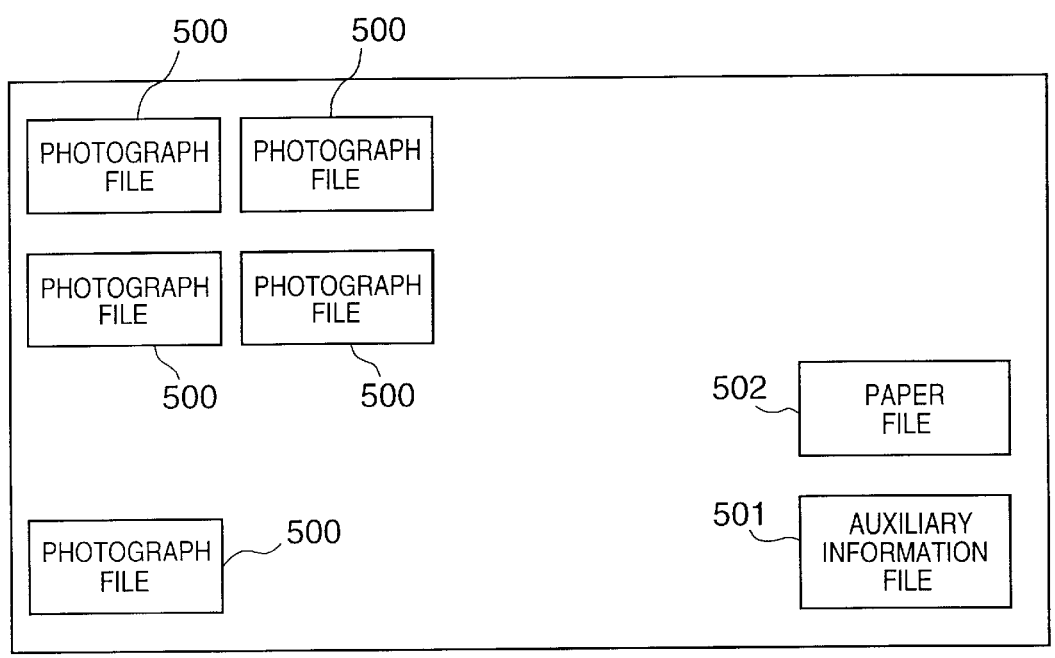
FIG. 4 is a diagram showing an example of the structure of a file in an external card in first, third and fourth embodiments.

FIG. 4 illustrates an example of the composition of a file within the external card 51. FIG. 4 shows photograph files 500 each of which stores a photograph image obtained by photography, and an auxiliary information file 501 storing printing information used when the photograph files 500 were printed. The composition of the auxiliary information file is similar to that of the printing setting table 61 shown in FIG. 3 and need not be described again. Also shown is a paper file 502 storing paper information for printing purposes, the information being used when the photograph files 500 were printed. A plurality of the paper files 502 may exist within the external card 51; however the external card 51 does not necessarily store the paper file 502.

Accordingly, if the apparatus has not executed a printing operation even once, only photograph files 500 corresponding to the number of photographs taken will be stored in the external card 51. One auxiliary information file 501 is stored in response to one execution of printing by the apparatus.

Whether the content of the last printing setting used when extra prints were made exists in the external card 51 as auxiliary information is discriminated at step S4. That is, the CPU determines whether the auxiliary information file 501 exists in the external card 51. Control proceeds to step S5 if the auxiliary information file 501 exists in the external card 51 and to step S6 if it does not.

Step S5 is auxiliary information duplication processing for making the content of the last printing setting effective when extra prints are to be made. More specifically, the content of the auxiliary information file 501 in external card 51 is duplicated in the printing setting table 61, which has been obtained in the RAM 6, by writing it over the other elements with the exception of "number of prints". With regard to the "number of prints" in the table, the value of "number of prints" in the table is left as is if the print count flag is "on". If the flag is "on", however, the value of the corresponding "number of prints" in the auxiliary information file 501 within external card 51 is written over the value of "number of prints" in the table. When updating of the content of printing setting table 61 is thus completed, control proceeds to step S6, where creation of print data is carried out.

If the indication "extra prints" is entered at step S1 in the manner described above, the printing setting table 61 in RAM 6 is updated based upon the auxiliary information file 501 of external card 51, as described above. Printing processing starts after the printing setting table 61 is updated. If "print" has been entered at step S1, the printing setting table 61 is left as is and printing processing is then started. Printing processing in this embodiment is carried out based upon the printing setting table 61 in a manner described later. Accordingly, in "extra prints" processing that requires printing to be performed in the same manner as the last time printing was executed, the setting content in external card 51 is rendered effective. In ordinary "print" processing, on the other hand, it is possible to execute printing based upon new settings.

Actual printing processing is executed based upon the set content of printing setting table 61 in RAM 6 and the set content of paper information table 41 in SRAM 4 at step S6.

Figure 5:
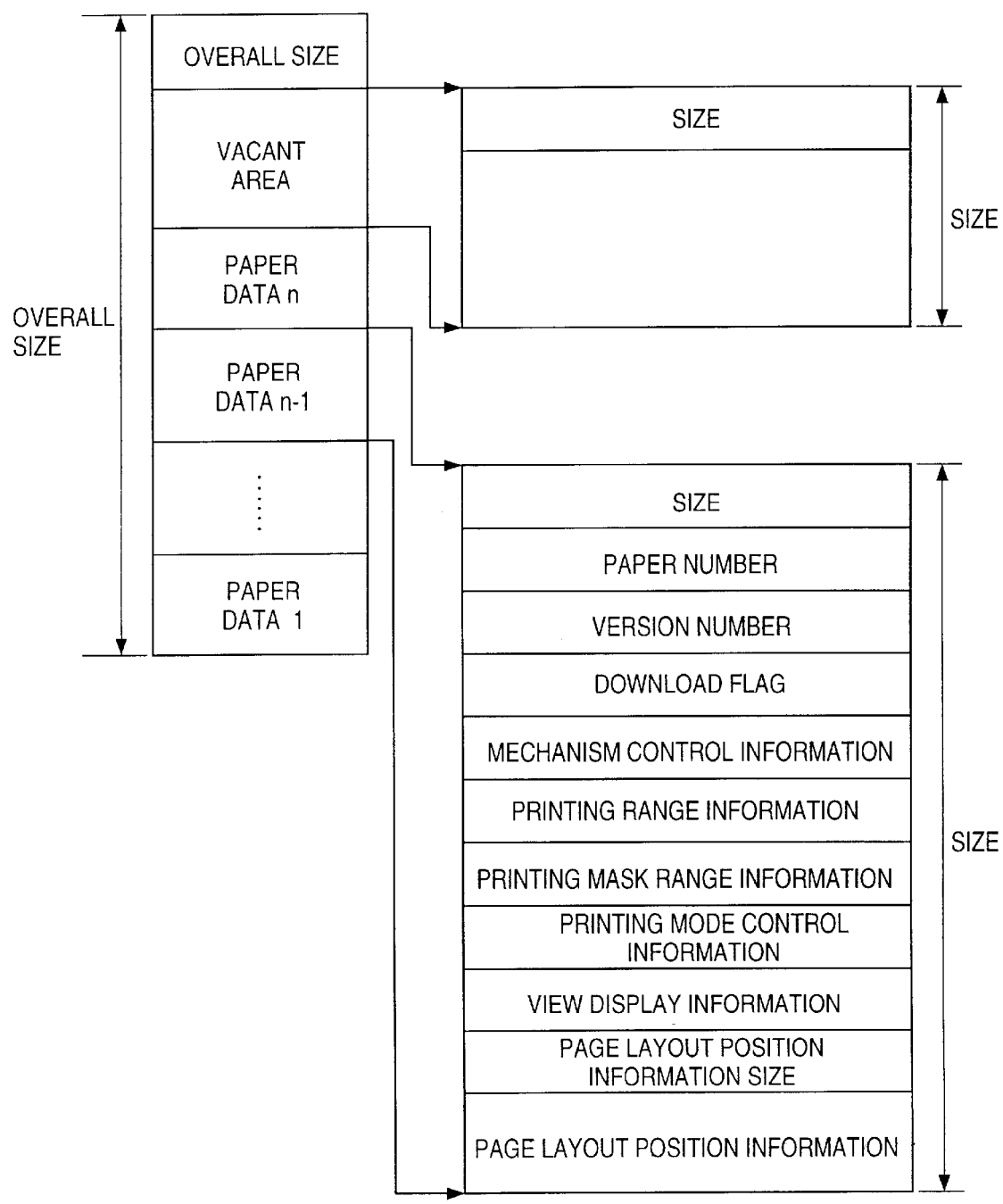
FIG. 5 is a diagram showing an example of the composition of a paper information table.

FIG. 5 illustrates an example of the composition of paper information table 41 in SRAM 4. This will now be described. In this embodiment, paper information commensurate with the types of paper that can be printed on by the apparatus is stored (registered) in the paper information table 41 beforehand. As shown in FIG. 5, n types of paper information "data 1" through "data n" have been stored in order in paper information table 41 starting from the end of the table. A "vacant area" following "overall size" at the beginning of the paper information table 41 represents a vacant area set aside beforehand when the apparatus is shipped from the factory. If a new type of paper not registered in the paper information table 41 is capable of being printed on by this apparatus, then printing processing for this paper is made possible in the apparatus by registering paper data corresponding to this paper in the paper information table 41 as new paper data.

Figure 6A:
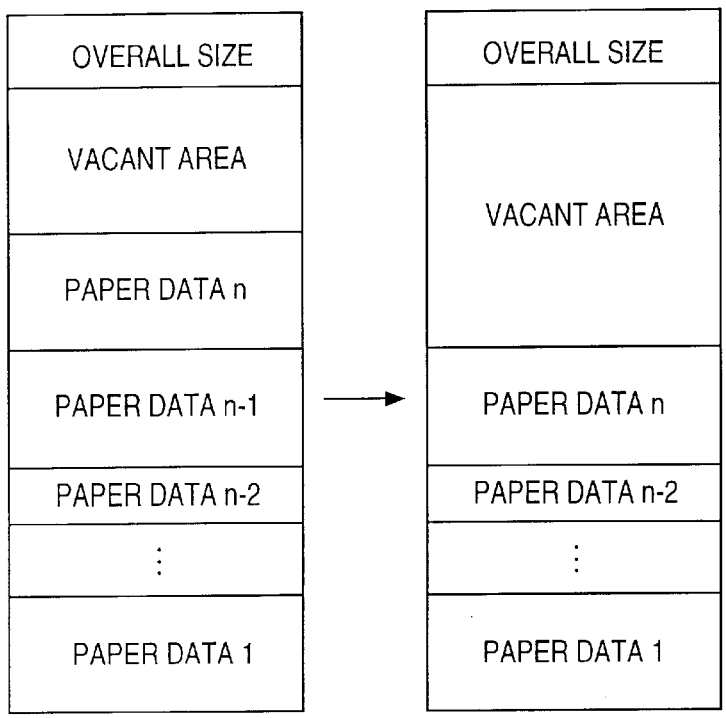
FIGS. 6A and 6B are diagrams useful in describing a method of registering paper data in the paper information table.
Figure 6B:
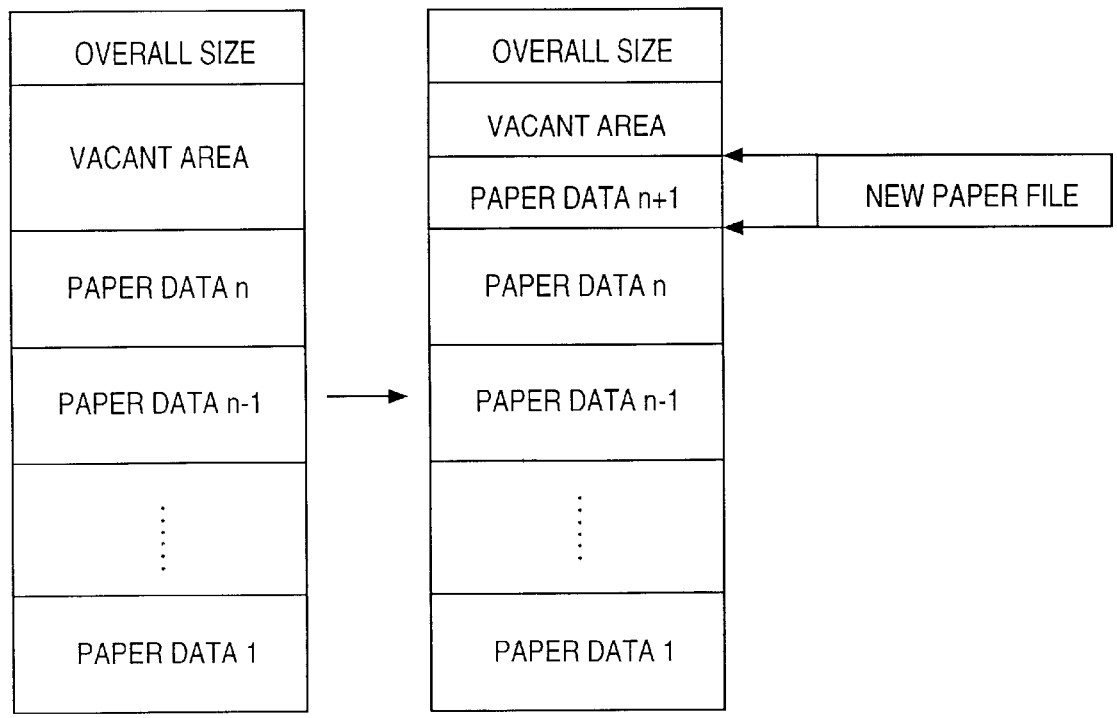

In a case where new paper data that has been provided is registered in the apparatus anew, it will suffice to acquire a paper data area within the "vacant area" in paper information table 41 and register the "paper data" indicative of the new paper in this area, as illustrated in FIG. 6B.

It should be noted that each item of "paper data" has a size that is variable in terms of length. Accordingly, "size" information representing the size of the area is stored at the beginning of each item of "paper data" in advance, as shown in FIG. 5. In a case where it is desired to obtain a later version of already registered "paper data n−1", for example, the content of this item of data need only be replaced by the new content if the data size is the same. If the data size changes, however, the area storing "paper data n−1" is cleared temporarily, as shown in FIG. 6A, and the space is taken up by "paper data n" on the side of "paper data n−2", thereby increasing the side of the "vacant area". Next, the paper data of the later version is registered in the "vacant area" as the new paper data, whereby "paper data n+1" is created.

It should be noted that "paper data" has a "paper number" uniquely defined by the type of paper, as shown in FIG. 5. This "paper number" is the "paper number" in the printing setting table 61 shown in FIG. 3. The "paper data" further includes a "version number" of the paper data, in which the larger the number, the newer the version; a "download flag" the initial setting of which is "off" but which is set to the "on" state if "paper data" has been downloaded to the apparatus; "mechanism control information", which indicates various information related to control of the mechanism, such as information indicating the amount of paper feed that corresponds to this paper and information indicating head-paper clearance that corresponds to paper thickness; "printing range information", which indicates a printing range that corresponds to the paper; "printing mask range information", which is for controlling the printing area in such a manner that the area will not overlap the area of a picture of figure that has already been printed on the paper; "printing mode control information", which indicates the amount of ink discharged and the discharge control method that correspond to the paper; "view display information", which indicates information such as an icon and paper name when the type of paper is displayed; "page layout position information", which indicates page layout information provided in advance; and "page layout position information size", which indicates the size of the information.

Figure 7:
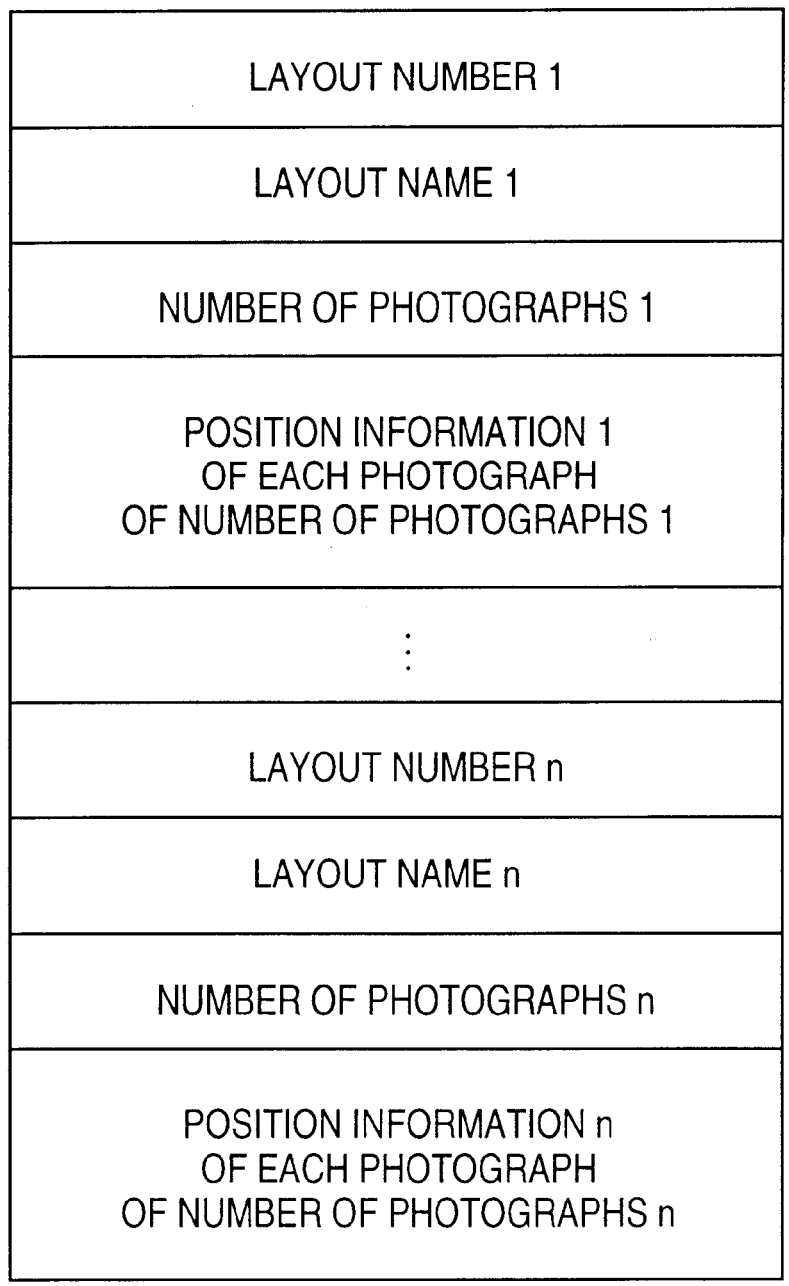
FIG. 7 is a diagram showing an example of the structure of page layout position information.

FIG. 7 is a diagram showing an example of the structure of the "page layout position information". As shown in FIG. 7, the "page layout position information" includes "layout name" for the view display, "number of photographs" to be laid out, and "position information of each photograph" in the layout, these being stored to correspond to a definable "paper number" and "layout number" in this embodiment.

Print data is created at step S6, where actual printing processing is executed based upon the set contents of the paper information table 41 and printing setting table 61 described above. More specifically, the print count flag is turned "off" and the print data is created based upon the "page layout position information" in the paper information table 41 that corresponds to the "paper number" and "layout number" in the printing setting table 61, and the photograph file 500 in external card 51 that corresponds to the "photograph number n".

If it is found at step S3 that the external card 51 has not been loaded or that the loaded external card 51 does not have a usable format, print data cannot be created at step S6. Before a print command is sent to the printing unit 3, therefore, printing processing terminates in an error. Further, in a case where the photograph file 500 corresponding to the "photograph number" in the printing setting table 61 does not exist in the external card 51, i.e., if the photograph file 500 used the last time has already been deleted when the user executes the operation for making extra prints, the photograph file 500 that is the object of the printing operation will be available and therefore control is carried out in such a manner that extra prints will not be made.

If the print data could be created normally, then a paper control command is output to the printing unit 3 to perform initialization. This is executed by sending the printing unit 3 the "mechanism control information" in the "paper data" that corresponds to the "paper number" in paper information table 41. On the basis of the mechanism control information input thereto, the printing unit 3 performs various initialization operations for printing on the printing paper that corresponds to the "paper number".

After a paper feed command is output to the printing unit 3 and paper feed processing is executed, the print data that has been created is developed in a print buffer acquired in RAM 6 and the content of the print buffer is output to the printing unit 3 to control printing in the column direction. Further, a prescribed number of line-feed commands are output to the printing unit 3 to perform control in the line direction. After one page of printing processing is executed by repeating this, paper-discharge processing is executed by outputting a paper discharge command to the printing unit 3. By repeating the foregoing paper feed, page printing and paper discharge processing a number of times commensurate with the "number of prints" specified by the printing setting table 61, the printing processing at step S6 ends normally.

It should be noted that this embodiment is premised upon use of an ink-jet printer (a device which utilizes thermal energy to discharge ink droplets) as the printing unit 3. Since print control processing in such a printer is well known, the details need not be described here. Further, it is assumed that the photograph file 500 in this embodiment has been stored in the external card 51 upon being compressed in accordance with the JPEG scheme. This is to conserve memory capacity in the external card 51. Accordingly, when the photograph file 500 is converted to print data in this embodiment, the compressed photograph file 500 is decompressed. Then, in order to execute effect processing indicated by the "photograph effect number n-" that corresponds to "photograph number n" in the printing setting table 61, prescribed image processing (e.g., a rectangular conversion, scaling processing, color conversion processing, etc.) is applied.

In a case where an error of some kind has occurred during printing processing, the printing unit 3 outputs error information. In this case a paper discharge command is output to the printing unit 3 to discharge the paper and a forced abort command is output to the printing unit 3 to forcibly terminate printing processing. Abnormal end is discriminated at step S7 and the processing of FIG. 2 is terminate.

If it is determined at step S7 that the printing processing of step S6 has ended normally, then control proceeds to step S8, where it is determined whether the external card 51 is usable in the external memory drive. More specifically, it is determined whether the external card 51 has been loaded in the external memory drive 5 and, if the card has been loaded, it is determined whether the external card 51 has a usable format. If the external card 51 cannot be used, the processing of FIG. 2 is terminated. If the card is usable, on the other hand, control proceeds to step S9. By executing this external-card confirmation processing, a normal end will be achieved, and only auxiliary information update processing (step S9), described below, will not be executed, even in a case where the external card 51 is pulled out of the external memory drive 5 during a printing operation.

At step S9, the content of the printing setting table 61 and the content of paper data that corresponds to the "paper number" in paper information table 41 is stored in the external card 51. This constitutes auxiliary information update processing. More specifically, if the auxiliary information file 501 does not exist in the external card 51, the auxiliary information file 501 is created anew based upon the content of the printing setting table 61. If the auxiliary information file 501 does exist in the external card 51, on the other hand, the content of the auxiliary information file 501 is updated by the content of the printing setting table 61.

Furthermore, when the updating of the paper file 502 is carried out, it is determined whether the paper data corresponding to the "paper number" of paper actually printed on was downloaded. That is, in a case where the "download flag" corresponding to the "paper number" is "on" in the paper information table 41, the paper file 502 is created anew based upon the content of "paper data" in the paper information table 41 if the paper file 502 does not exist in the external card 51. In a case where the paper file 502 does exist in the external card 51, on the other hand, its "version number" and the "version number" of the aforesaid "paper data" in paper information table 41 are compared. If the former is smaller than the latter, then the content of the paper file 502 is updated by the content of the "paper data" that corresponds to the "paper number" in paper information table 41.

By virtue of the foregoing operation, printing processing and processing for making extra prints according to the embodiment shown in FIG. 2 is terminated.

[Other Function Processing]

The processing associated with other functions indicated at step S2 in FIG. 2 is shown in detail in the flowchart of FIG. 8 and will now be described. The CPU 7 discriminates, at step S91 in FIG. 8 in a manner similar to that of step S1 in FIG. 2, the type of button pressed on the instruction input unit 1. Control proceeds to step S92, which is processing for increasing the number of copies printed, if a "+" button has been pressed, and to step S93, which is processing for decreasing the number of copies printed, if a "−" button has been pressed. Control proceeds to download processing at step S95 if a "download" button has been pressed at step S91 and to processing at step S96 for the view display if a "view display" button is pressed at step S91. If another button is pressed at step S91, control proceeds to other processing at step S97.

The processing of each of the steps S92 through S96 will now be described.

[Processing for Increasing/Decreasing Number of Copies]

The processing executed at step S92 increases the number of copies to be printed. Specifically, the CPU turns on the print count flag in RAM 6, compares the value of "number of prints" in printing setting table 61 of FIG. 3 with the maximum value of the number of copies set in advance in this embodiment and increments the value of "number of prints" only if the value of "number of prints" is less than the maximum value. Control then proceeds to step S94.

The processing executed at step S93 decreases the number of copies to be printed. Specifically, the CPU turns on the print count flag, compares the value of "number of prints" in printing setting table 61 with the minimum value (=1) of the number of copies and decrements the value of "number of prints" only if the value of "number of prints" is greater than the minimum value. Control then proceeds to step S94.

Display processing for displaying the number of copies to be printed is executed at step S94. That is, processing for increasing/decreasing number of copies is terminated by outputting the value of "number of prints" in printing setting table 61 to the display unit 2 and causing the value to be displayed.

[Download Processing]

Figure 9:
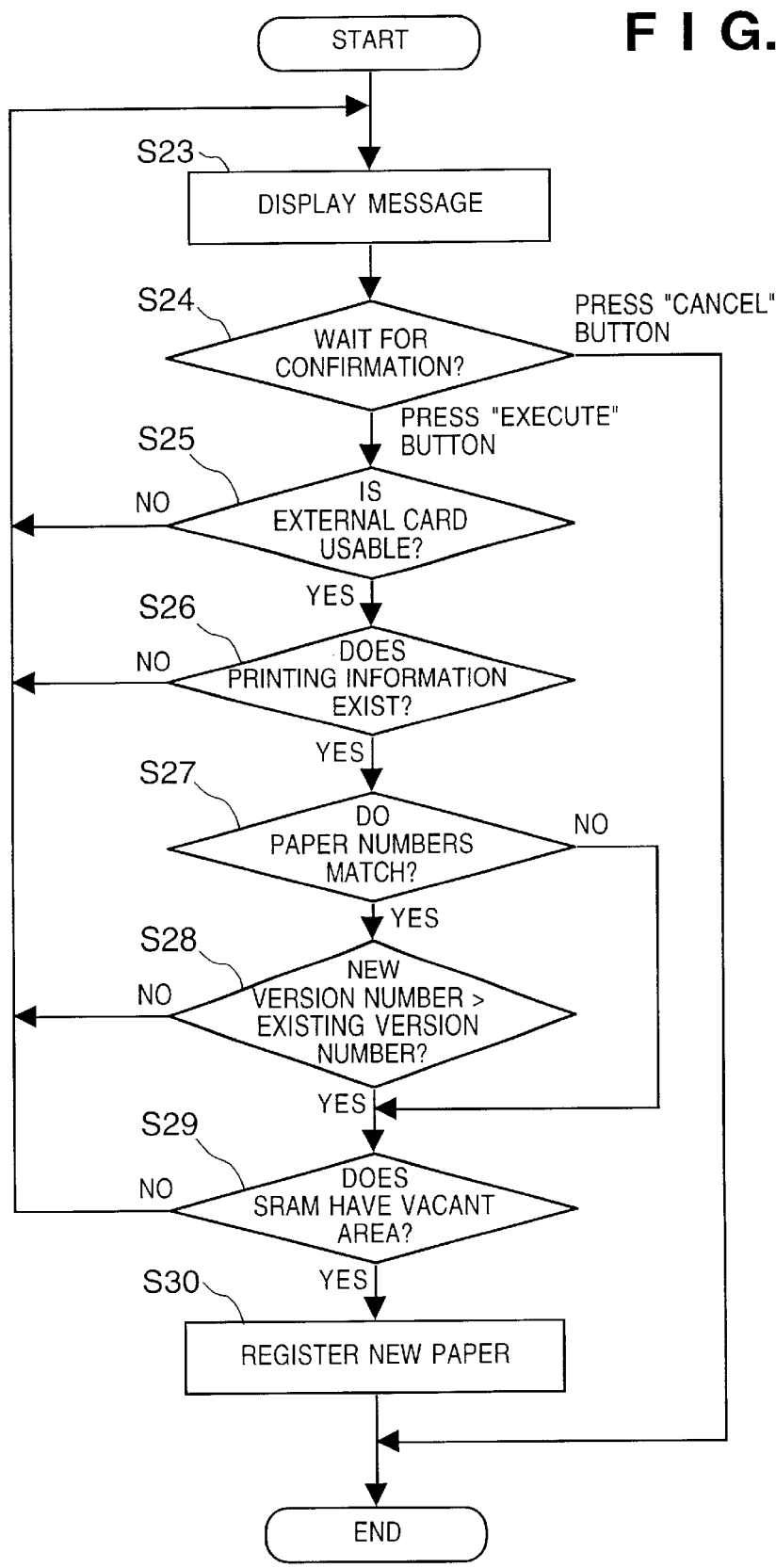
FIG. 9 is a flowchart illustrating download processing in the first embodiment.

The details of download processing at step S95 will be described with reference to the flowchart of FIG. 9. If the "download" button has been pressed, first a message such as "LOAD EXTERNAL CARD" for prompting user operation is displayed at step S23. More specifically, the display unit 2 displays a message calling for the user to load the external card 51, on which paper information desired to be downloaded has been stored, in the external memory drive 5, after which control proceeds to step S24. It should be noted that the structure of the file in the external card 51 to be loaded at the time of downloading may have the format shown in FIG. 4 or may have a format storing only the paper file 502 that is the object of downloading.

At step S24 the apparatus waits for confirmation, i.e., waits for a response to the operation that the operator was prompted to perform. More specifically, if the user presses an "execute" button on the instruction input unit 1, the CPU judges that a "true" response has been sent back in response to the prompted operation and construes that the external card 51 has been loaded in the external memory drive 5. Control then proceeds to step S25. On the other hand, if the user presses a "cancel" key on the instruction input unit 1, the CPU judges that a "false" response has been sent back in response to the prompted operation, cancels the entry resulting from pressing of the "download" button and terminates the download processing shown in FIG. 9.

It is determined at step S25 whether the external card 51 is usable in the external memory drive 5. More specifically, it is determined whether the external card 51 has been loaded in the external memory drive 5 and, if the card has been loaded, it is determined whether the external card 51 has a format that can be used. If the external card 51 has not been loaded, control returns to step S23 and the user is again prompted to load the external card 51. If the card cannot be used even though it has been loaded, control returns to step S23 and an error message to the effect "CARD DOES NOT HAVE USABLE FORMAT" is reported to the user. If the external card 51 is usable, however, control proceeds to step S26.

It is determined at step S26 whether the paper file 502 exists in the external card 51. If the decision rendered is "NO", control returns to step S23, where an error message to the effect "PAPER INFORMATION TO BE LOADED DOES NOT EXIST" is reported to the user.

If the paper file 502 exists, on the other hand, it is determined at step S27 whether the "paper number" in the paper file 502 is the same as the "paper number" of any of the items of paper data in paper information table 41. If there is not a single match, the CPU judges that it is necessary to add new paper information to the paper information table 41. Control then proceeds to step S29. However, if an identical "paper number" is found at step S27, then the CPU compares the two version numbers at step S28. If the "version number" of the "paper data" in paper information table 41 is equal to or greater than the "version number" in paper file 502, then control returns to step S23 and an error message to the effect "ALREADY DOWNLOADED" is reported to the user. If the "version number" of the "paper data" in paper information table 41 is smaller, then the CPU judges that it is necessary to use a newer version. Control then proceeds to step S29.

When the content of the paper file 502 is registered in the paper information table 41 in SRAM 4, it is determined at step S29 whether the SRAM 4 has a vacant area. More specifically, if "paper data" having a "paper number" the same as the "paper number of paper file 502 exists in the paper information table 41, the CPU finds a value, which is obtained by subtracting the "size" in the aforesaid "paper data" from the "size" of the paper file 502, and adopts this value as the new size. On the other hand, if an identical "paper number" does not exist, the "size" in the paper file 502 is adopted as the new size. The aforesaid new size and "size" of the "vacant area" in paper information table 41 are compared. If the latter is smaller, this means that the vacant area is inadequate. Consequently, registration of the paper file 502 is abandoned, control returns to step S23 and an error message to the effect "SIZE INADEQUATE" is reported to the user. If the new size is equal or smaller, control proceeds to step S30.

The content of the paper file 502 is registered in the paper information table 41 at step S30. More specifically, in a case where "paper data" corresponding to the "paper number" of paper file 502 exists in the paper information table 41, first the aforesaid "paper data" portion is erased and then the "paper data" between the aforesaid "paper data" and the "vacant area" is moved up to enlarge the "vacant area", as shown in FIG. 6A. Next, as shown in FIG. 6B, the "vacant area" is divided anew into a "vacant area" and "paper data" and the content of the paper file 502 is duplicated in this newly obtained "paper data". Further, in order to indicate that the aforesaid "paper data" has been downloaded, the "download flag" in the newly created "paper data" is turned "on", thereby ending the processing of FIG. 9.

Thus, as described above, new paper information can easily be registered in the SRAM 4 of the apparatus by loading the external card 51, on which the paper file 502 for downloading has been stored in response to the "download" indication, in the external memory drive 5 and then entering the "execute" command.

[View Display Processing]

Figure 10:
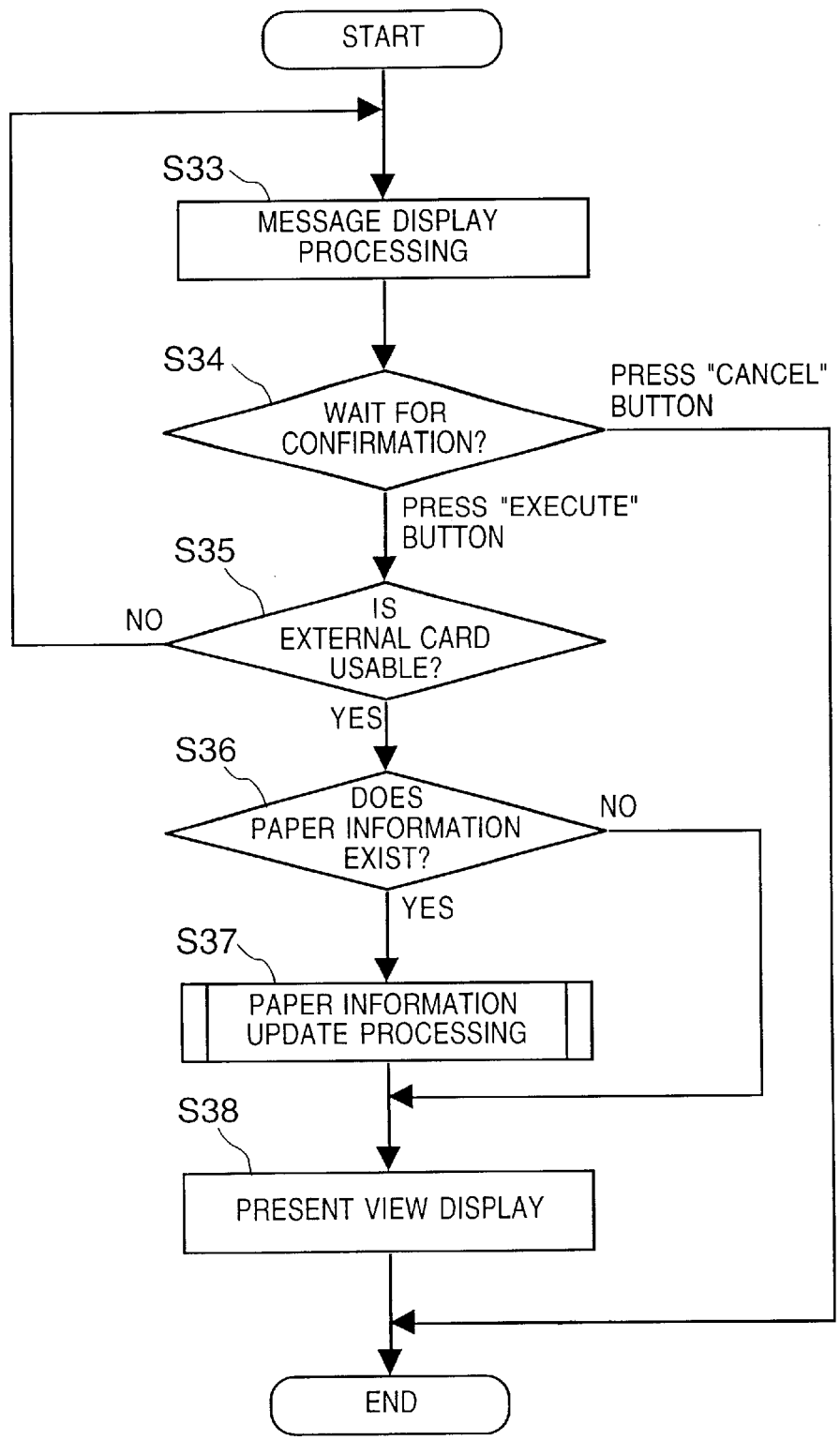
FIG. 10 is a flowchart illustrating processing for presenting a view display in this embodiment.

The details of view display processing at step S96 will be described with reference to the flowchart of FIG. 10. View display processing in this embodiment is processing for displaying a view of all photograph files 500 that have been stored in one external card 51. This processing makes it possible to register (download) new paper information even when the view display is being presented. More specifically, new paper information can be added to and registered in the paper information table 41 by the paper file 502 in the external card 51 on which the photograph files 500 have been stored.

If the "view display" button has been pressed, first a message such as "LOAD EXTERNAL CARD" for prompting user operation is displayed at step S33. More specifically, the display unit 2 displays a message calling for the user to load the external card 51, on which a photograph file 500 desired to be presented in a view display has been stored, in the external memory drive 5, after which control proceeds to step S34.

At step S34 the apparatus waits for confirmation, i.e., waits for a response to the operation that the operator was prompted to perform. More specifically, if the user presses the "execute" button on the instruction input unit 1, the CPU judges that a "true" response has been sent back in response to the prompted operation and construes that the external card 51 has been loaded in the external memory drive 5. Control then proceeds to step S35. On the other hand, if the user presses the "cancel" key on the instruction input unit 1, the CPU judges that a "false" response has been sent back in response to the prompted operation, cancels the entry resulting from pressing of the "view display" button and terminates the view display processing shown in FIG. 10.

It is determined at step S35 whether the external card 51 is usable in the external memory drive 5. More specifically, it is determined whether the external card 51 has been loaded in the external memory drive 5 and, if the card has been loaded, it is determined whether the external card 51 has a format that can be used. If the external card 51 has not been loaded, control returns to step S33 and the user is again prompted to load the external card 51. If the card cannot be used even though it has been loaded, control returns to step S33 and an error message to the effect "CARD DOES NOT HAVE USABLE FORMAT" is reported to the user. If the external card 51 is usable, however, control proceeds to step S36.

It is determined at step S36 whether the paper file 502 exists in the external card 51. Control proceeds to step S38 if the decision rendered is "NO" and to step S37 if the decision is "YES". If the paper information in the external card 51 and in the paper information table 41 requires updating, then this updating is performed at step S37. That is, if the paper file 502 in the external card 51 is information that is to be registered anew, then the information is registered anew in the paper information table 41. Further, if the paper file 502 is one whose version has been raised, then the paper information in the paper information table 41 is updated to the content of the paper file 502. If the paper information in the paper information table 41 is newer than that of the paper file 502, then the paper file 502 is updated by the paper information in paper information table 41. The details of paper information update processing at step S37 will be described later.

Figure 11:
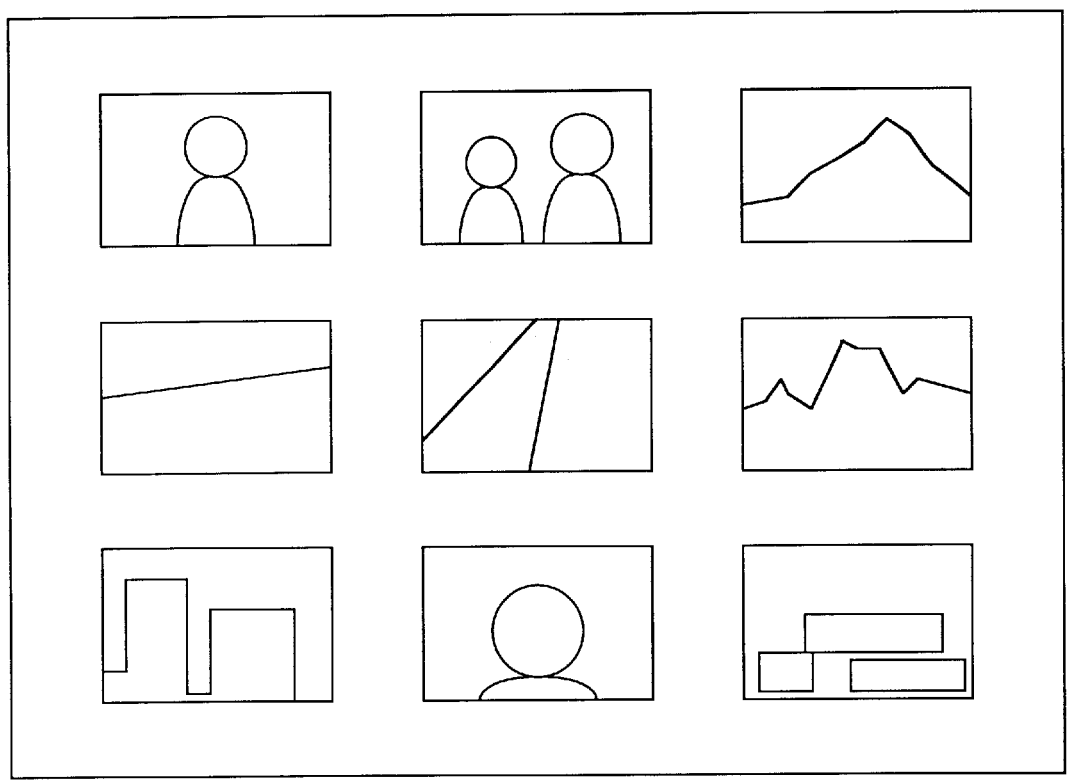
FIG. 11 is a diagram illustrating an example of a view display of photographs.

The photograph files 500 in the external card 51 that have been loaded in the external memory drive 5 are displayed on the display unit 2 in the form of a view display at step S38. That is, the photograph file 500 having the smallest serial number in the external card 51 is displayed at the upper left of the display unit 2, as shown in FIG. 11, then the photograph files 500 of successively larger serial numbers are displayed alongside and in succeeding rows. Presenting this view display ends the view display processing of FIG. 10.

It should be noted that the number of a photograph in this embodiment corresponds to the order in which the photograph file 500 stored in the external card 51 was created. For example, it is so arranged that the name of a photograph file will be expressed, in the order of creation thereof, as a serial number that will be unique. However, since there are instances where a photograph file among other photograph files is deleted, the photograph numbers are managed by treating the photograph file whose serial number is smallest as being the first photograph file.

Figure 12:
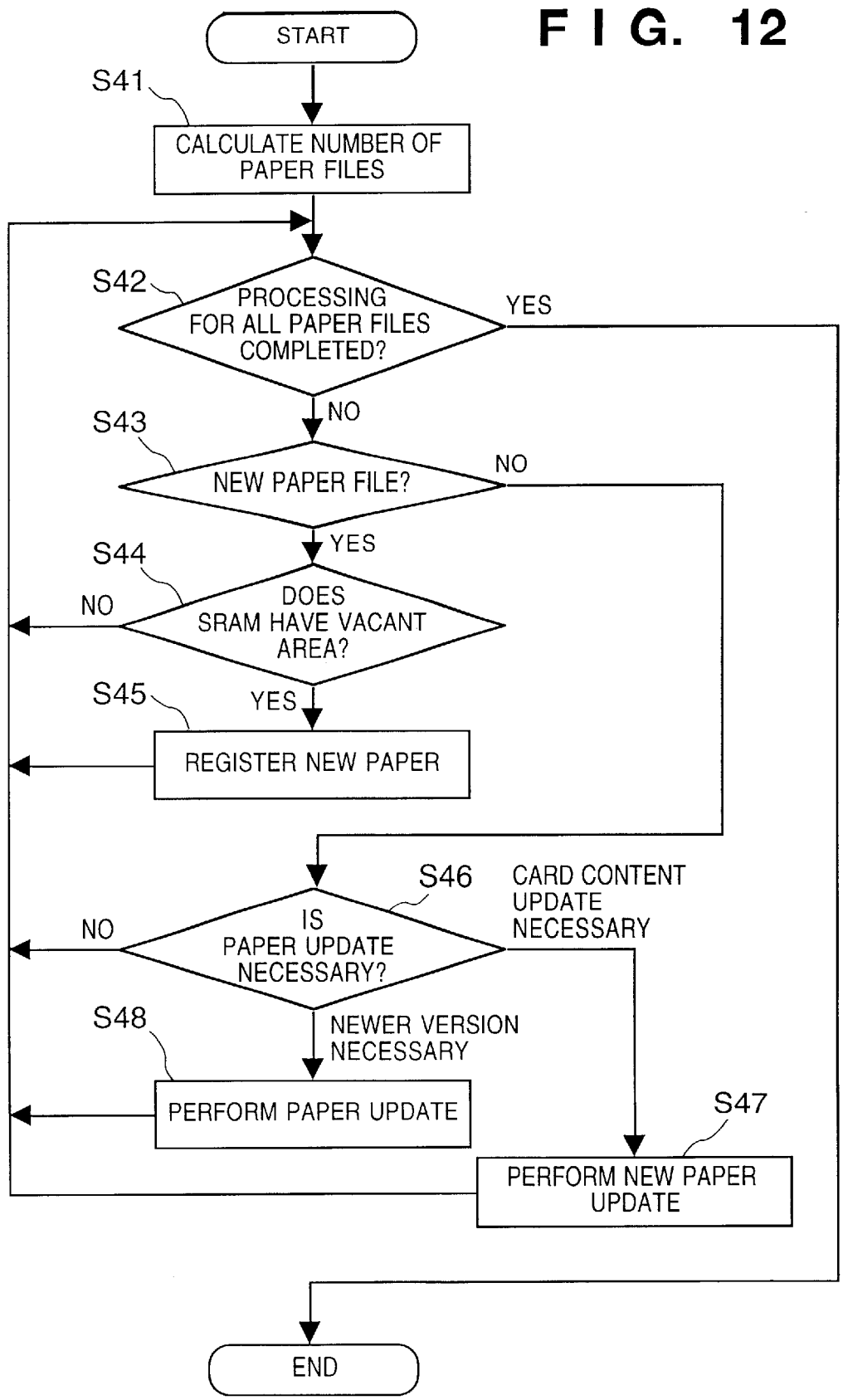
FIG. 12 is a flowchart illustrating paper information update processing in this embodiment.

The details of paper information update processing at step S37 will be described with reference to the flowchart of FIG. 12.

The number of paper files 502 that have been stored on the external card 51 is calculated at step S41. This is followed by step S42, at which it is determined whether the processing of all of the number of paper files calculated at step S41 has been completed. If the decision rendered at step S42 is "YES", then the paper information update processing shown in FIG. 12 is terminated. It should be noted that if the number of paper files 502 is found to be zero at step S41, i.e., if no paper files 502 exist in the external card 51, then processing is terminated via step S42.

If it is found at step S42 that the processing of all of the number of paper files calculated at step S41 has not been completed, the next paper file 502 is set as the object of processing and then the number of remaining files is decremented. Control then proceeds to step S43.

It is determined at step S43 whether the paper file 502 to undergo processing has already been registered in the paper information table 41. That is, it is determined whether the "paper number" in the paper file 502 is the same as the "paper number" of any of the items of "paper data" in paper information table 41. If there is a match, this means that the file has already been registered and, hence, control proceeds to step S46. If there is not a single match, on the other hand, it is judged that this file should be registered anew and control proceeds to step S44.

When the content of the paper file 502 is registered in the paper information table 41, it is determined at step S44 whether the SRAM has a vacant area. That is, "size" in the new paper file and "size" of the "vacant area" in paper information table 41 are compared. If the latter is smaller, the vacant area is inadequate and therefore registration of the paper file 502 is abandoned and control returns to step S42. If the new size is equal or smaller, on the other hand, control proceeds to step S45.

The content of the paper file 502 is registered in the paper information table 41 at step S45. More specifically, as shown in FIG. 6B, the "vacant area" is divided anew into a "vacant area" and "paper data" and the content of the paper file 502 is duplicated in this newly obtained "paper data". Further, in order to indicate that the aforesaid "paper data" has been downloaded, the "download flag" in the newly created "paper data" is turned "on" and control returns to S42.

The paper file 502 and "paper data" in the paper information table 41 that corresponds to the "paper number" of this file are compared at step s46 and it is determined whether it is necessary to alter the paper file 502 in the external card 51 or the "paper data" in the paper information table 41. More specifically, "version number" of the paper file 502 and "version number" of the "paper data" in the paper information table 41 are compared. If they are identical, this means that the same paper information has been stored in the external card 51 and in the paper information table 41. No change is required, therefore, and control returns to step S42. If "version number" of the "paper data" in the paper information table is larger than version number" of the paper file 502, the paper file 502 in the external card 51 needs to be changed and, hence, control proceeds to step S47. If "version number" of the "paper data" in the paper information table 41 is smaller than "version number" of the paper file 502, the paper information table 41 needs to be changed and, hence, control proceeds to step S48.

At step S47, the content of the paper file 502 has a version number older than that of the content of "paper data" in the paper information table 41, and therefore the paper file 502 is updated. That is, the paper file 502 is deleted from the external card 51 and a paper file 502 is created anew in the external card 51 based upon the content of "paper data" in the paper information table 41. Control then returns to step S42.

At step S48, the content of "paper data" in the paper information table 41 has a version number older than that of the content of the paper file 502, and therefore the content of "paper data" in the paper information table 41 is updated. That is, the content of "paper data" in the paper information table 41 is replaced by the content of the paper file 502. In order to indicate that downloading has taken place, the "download flag" in the updated "paper data" is turned "on" and control returns to step S42.

In this embodiment, as described above, it is possible to provide a newer version of the paper information in the SRAM 4 of the apparatus based upon the paper file 502, which has been stored in the external card 51, when the content of the view display of the photograph file 500 is read out of the external card 51. Furthermore, it is possible to provide a newer version of the paper file 502 in the external card 51 based upon the content of SRAM 4 in the apparatus. Accordingly, processing for updating the version of the paper information via the external card 51 can be performed in the apparatus automatically without the user needing to be aware of this processing.

Figure 8:
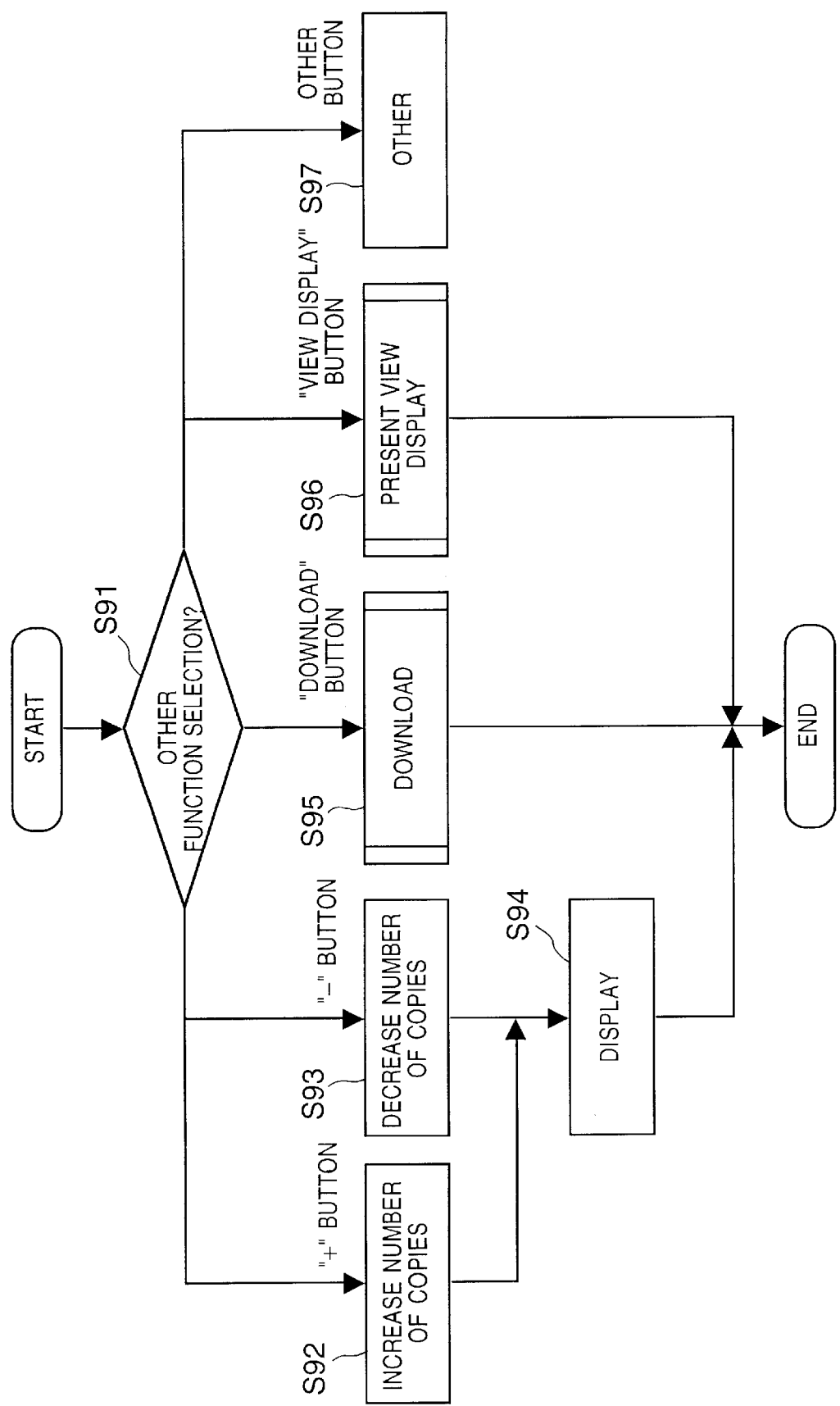
FIG. 8 is a flowchart illustrating processing of other functions in the first embodiment.

It should be noted that examples of other processing indicated at step S97 in FIG. 8 include operations for setting, on various setting screens, the type ("paper number") of printing paper, the layout type ("layout number") and photograph number ("photograph number n"). As a result, in a case where a prescribed item in the printing setting table 61 acquired in RAM 6 has been set again and "page number" or "layout number" has been changed, initializing is performed in regard to items of variable length. Here values set as prescribed items in printing setting table 61 are limited to a range capable of being set by the apparatus.

Further, such buttons for recovery processing in the printing unit as a "cleaning" button and "paper discharge" button are also dealt with by processing executed at step S97. Such recovery processing is well known and the details thereof are not described here.

Further, such buttons as a "cursor button" for moving an item in the view display and a "select" button for selecting an item on various setting screens such as that of the view display are dealt with by processing executed at step S97. Methods of implementing this processing are well known and need not be described.

In accordance with this embodiment, as described above, the last printing information used is always set in the auxiliary information file 501 in the external card 51. By performing printing that makes reference to this printing information when processing for making extra prints using the card is executed, the last setting can be made effective without making the same settings again. As a result, operability is enhanced since the user need no longer make settings the same as the last settings again.

Further, it is easy to newly register printing paper information. This makes it possible to perform printing with the optimum image quality even in regard to a new type of printing paper with which the printing apparatus is not provided as a printing paper candidate in advance.

<Second Embodiment>

A second embodiment of the present invention will now be described.

In the first embodiment set forth above, an example in which one auxiliary information file 501 exists in the external card 51 is described. In the second embodiment, there will be described an arrangement in which a plurality of the auxiliary information files 501 exist in the external card 51 and the history of each file is managed.

The construction of the image processing apparatus in the second embodiment is the same as that of the apparatus in the first embodiment and need not be described again.

[Index]

Figure 13:
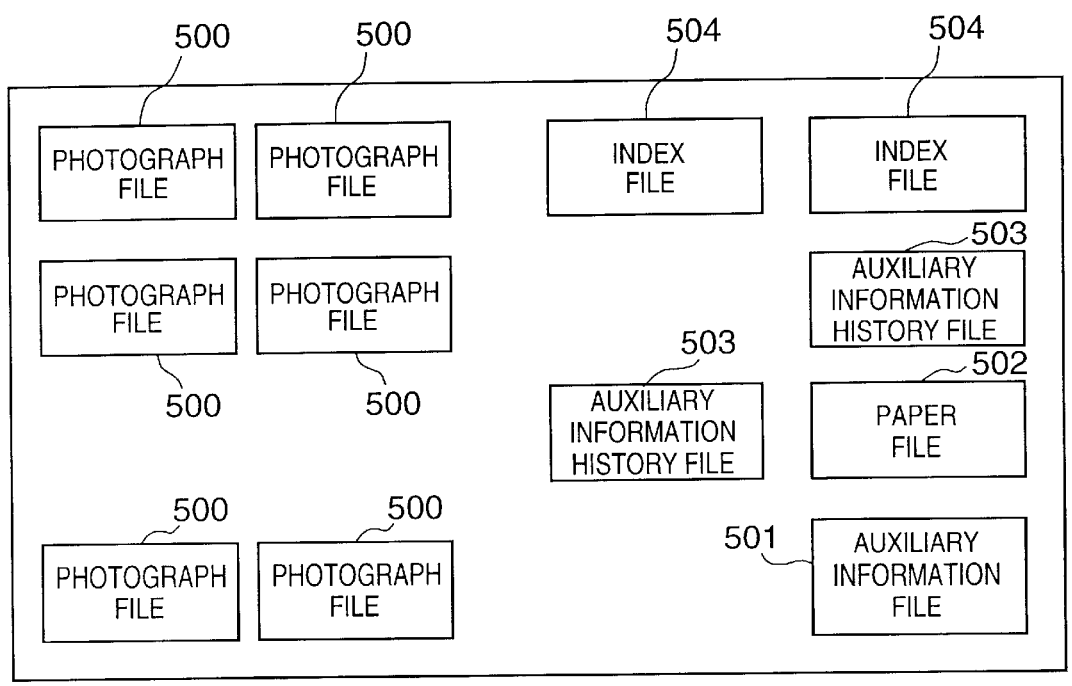
FIG. 13 is a diagram showing an example of the structure of a file in an external card in a second embodiment.

The structure of a file in the external card 51 according to the first embodiment is such that the file includes a plurality of photograph files 500, one auxiliary information file 501 and one paper file 502. First a file structure of the kind shown in FIG. 13 will be considered for the external card 51 in the second embodiment. In FIG. 13, one auxiliary information file 501 exists in addition to the paper file 502 with respect to a plurality of photograph files 500, and a plurality of auxiliary information history files 503, which are duplicates of the auxiliary information file 501 based upon the history of each auxiliary information file. Also included are a plurality of index files 504 for performing historical management of the auxiliary information file 501. If the size of one index file 504 is enough to manage all of the auxiliary information history files 503, then only one index file 504 need exist.

The file names of the auxiliary information history files 503 and index files 504 are expressed in a form in which an apparatus number unique for each apparatus and a serial number uniquely defined in dependence upon the order in which the files are created are added onto each file name. In order to manage the apparatus numbers and serial numbers, "apparatus number", "index file serial number" and "auxiliary information history file serial number" are stored in the SRAM 4 and "index file serial number" and "auxiliary information history file serial number" are each set to "0" before the apparatus is shipped.

Figure 14:
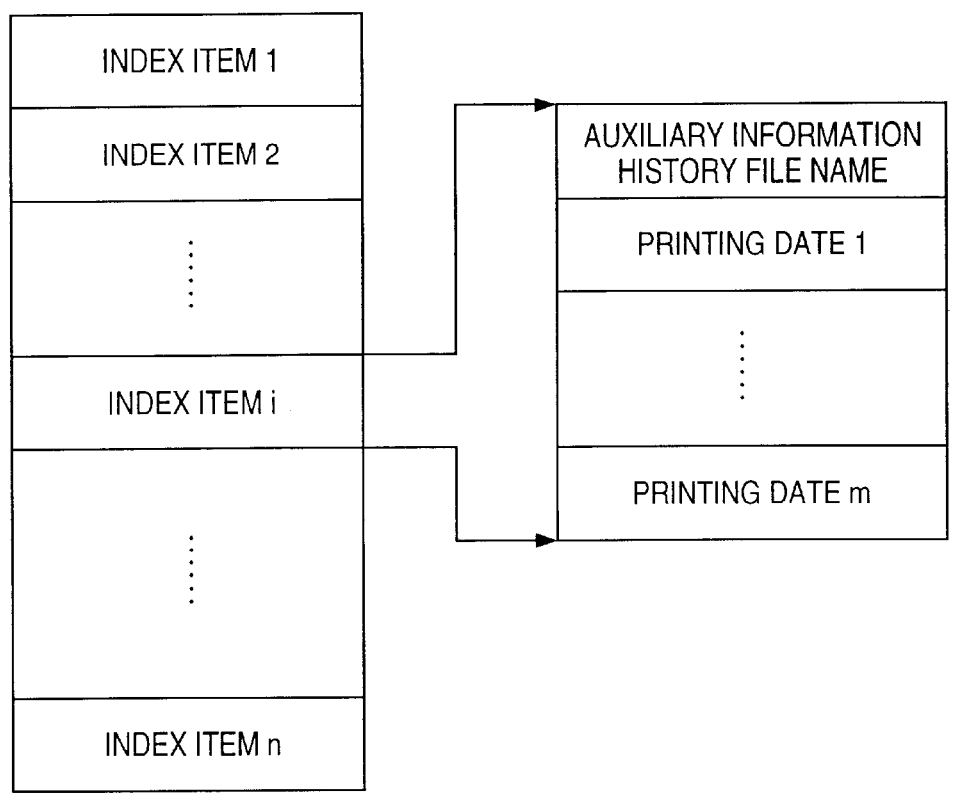
FIG. 14 is a diagram showing an example of the structure of an index file in the second embodiment.

FIG. 14 shows an example of the details of the index file 504. As shown in FIG. 14, the index file 504 is composed of a prescribed number of index items. Stored in each "index file" at the beginning thereof is the "auxiliary information historical file name" of a auxiliary information history file 503 that is to be managed. This is linked to the auxiliary information history file 503. The index file 504 also has a prescribed number of "printing date" storage areas in which are stored a prescribed number of dates on which printing was executed using this auxiliary information history file 503. For example, "0" is set as the content of an item that is not being used. More specifically, if a certain "index item" is not in use, then "auxiliary information historical file name" in this index item is set to "0". If the area of a certain "printing date" is not in use, the content of this area is set to "0".

[Composition of Printing Setting Table]

As shown in FIG. 3, the composition of the printing setting table 61 according to the first embodiment is such that for one photograph, the table retains the "photograph number" of this photograph and the "photograph effect number". In order to manage the history of a plurality of auxiliary information files in the second embodiment, a situation is assumed in which a certain photograph is deleted from the printing setting table 61 and a different photograph is registered for this photograph number. In order to make it possible to deal with such a situation, the composition of the printing setting table 61 is made as shown in FIG. 15. Specifically, the table is adapted to hold "photography date" in addition to "photograph number" and "photograph effect number" in regard to one photograph.

Figure 19:
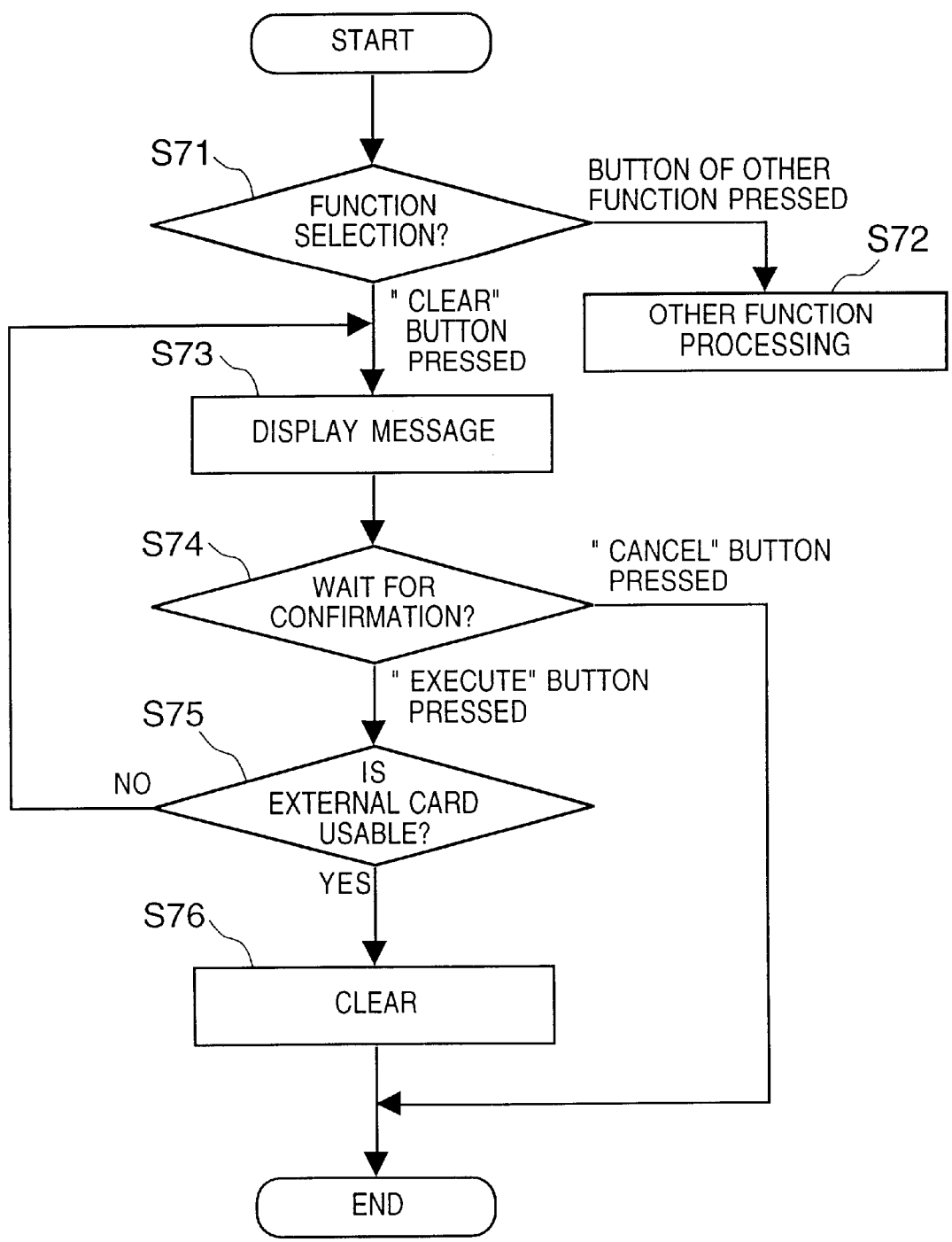
FIG. 19 is a flowchart illustrating processing of other functions in the second embodiment.

At the same time that "photograph number" is set in the processing of other functions at step S72 in FIG. 19, the date of photography that has been stored in the photograph file that corresponds to this photograph number is set as the "photography date" in the printing setting table 61. Using this "photography date", it is possible to determine, in a manner described later, whether the photograph in the auxiliary information file 501 is the proper photograph.

Further, for the purpose of establishing a link to the auxiliary information history file 503 that corresponds to the auxiliary information file 501, the printing setting table 61 retains an "index number" and an "index item number". The "index number" corresponds to the apparatus number and serial number (index file name) in index file 504. The "index item number" corresponds to the number of the "index item" in index file 504. The initial numbers of "index number" and "index item number" are "apparatus number +1" and "1", respectively. It should be noted that the set values of "photography date", "index number" and "index item number" are made "0", for example, when the content of the printing setting table 61 is initialized and when printing ends.

The structure of the auxiliary information file 501 in the external card 51 of the second embodiment is the same as that of the printing setting table 61.

[Auxiliary Information Update Processing]

Figure 16:
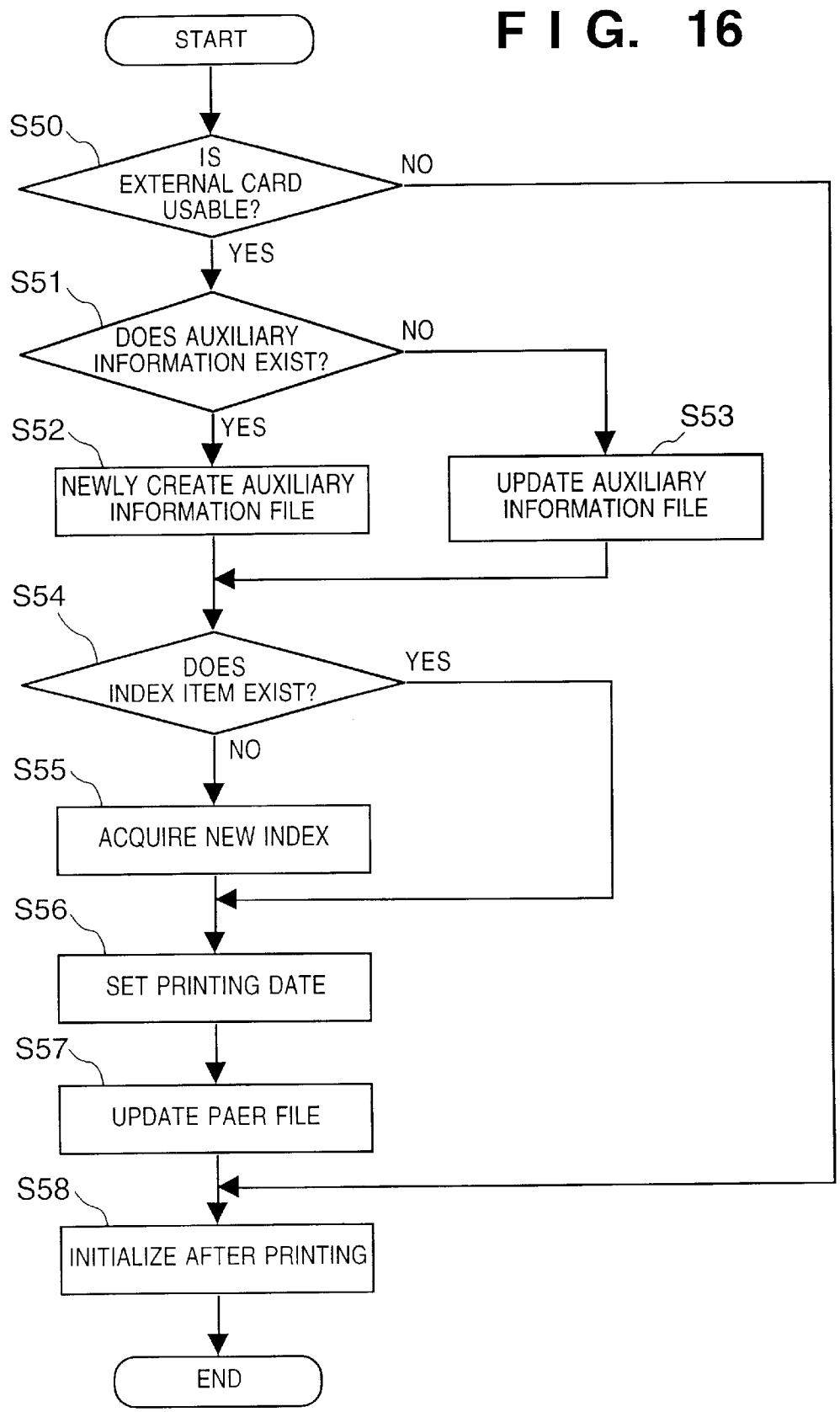
FIG. 16 is a flowchart illustrating processing for updating auxiliary information in the second embodiment.

Processing for updating the auxiliary information file 501 in the second embodiment involves making the processing of steps S8 and S9 in FIG. 2 described in conjunction with the first embodiment conform to a case where a plurality of the auxiliary information files 501 exist. The details of processing for updating the auxiliary information file 501 in the second embodiment will be described with reference to the flowchart of FIG. 16.

It is determined at step S50 whether the external card 51 is usable in the external memory drive 5. More specifically, it is determined whether the external card 51 has been loaded in the external memory drive 5 and, if the card has been loaded, it is determined whether the external card 51 has a format that can be used. Control proceeds to step S58 if the external card 51 cannot be used and to step S51 if the card can be used. By executing this external-card confirmation processing, a normal end will be achieved, and only auxiliary information update processing will not be executed, even in a case where the external card 51 is pulled out of the external memory drive 5 during a printing operation.

Next, it is determined at step S51 whether the auxiliary information file 501 exists. Control proceeds to step S52 if the auxiliary information file 501 does not exist in the external card 51 and to step S53 if the card does exist in the external card 51.

The auxiliary information file 501 is created in the external card 51 anew at step S52. That is, the auxiliary information file 501 is created in the external card 51 anew based upon the content of the printing setting table 61 in RAM 6. Control then proceeds to step S54.

The content of the auxiliary information file 501 present in the external card 51 is updated at step S53. More specifically, the content of the auxiliary information file 501 is updated by the content of the printing setting table 61. Control then proceeds to step S54.

It is determined at step S54 whether an index item for managing the history of the auxiliary information file 501 already exists. That is, if the content of "index item number" in the printing setting table 61 is "0", it is judged that no index items exists. Control proceeds to step S55, therefore, in order to acquire an index item anew. If "index item number" is not "0", on the other hand, then an index item already exists and, hence, control proceeds to step S56.

An index item is acquired anew at step S55. More specifically, an unused index item is searched for and obtained in the index file 504 and a new serial number is obtained by incrementing "auxiliary information history file serial number" stored in the SRAM 4. An auxiliary information history file name based upon "apparatus number+ new serial number" is created and a auxiliary information history file 503 is created anew using the created file name. Further, "apparatus number+new serial number" of the index file 504 is set in "index number" of the printing setting table 61, and the index item number of the acquired index item is set in "index item number" of the printing setting table 61. The content of printing setting table 61 is duplicated in the newly created auxiliary information history file 503 and the file name of the newly created auxiliary information history file 503 is set in "auxiliary information history file name" of the obtained index item, after which control proceeds to step S56.

In a case where not a single index file 504 exists in the external card 51, or in a case where an unused index item does not exist, a serial number that is the result of incrementing "index file serial number" stored in the SRAM 4 is obtained and an index file name based upon "apparatus number+serial number" is created. An index file is created anew using this file name and the content thereof initialized to all "0"s, after which the above-described retrieval of an index item is carried out.

A printing date is set as the index item at step S56. More specifically, unused "printing date i" is searched sequentially from "printing date 1" in the index item of index file 504 indicated by "index number" and "index item number" in printing setting table 61. The present date is then set in the "printing date i" obtained and control proceeds to step S57. If an unused "printing date i" does not exist, i.e., if "printing date 1" through "printing data n" have all already been set, then "printing date 2" through "printing data n" are successively copied to "printing date 1" through "printing data n−1" and the present date is set in "printing date n". As a result, "printing date n" is set as the latest printing date.

Updating of the paper file is carried out at step S57. More specifically, if, in a case where the "download flag" of the paper data that corresponds to "paper number" in printing setting table 61 is "on" in the paper information table 41 shown in FIG. 5, a new paper file that corresponds to this "paper number" does not exist in the external card 51, then a new paper file is created based upon the content of the paper data that corresponds to "paper number" in paper information table 41. On the other hand, if a new paper file does exist in the external card 51, the version umber in this new paper file and the version number of the paper data that corresponds to "paper number" in the paper information table 41 are compared. If the former is smaller than the latter, then the content of the new paper file is updated by the content of "paper data" that corresponds to "paper number" in the paper information table 41.

Initialization processing that follows printing is executed at step S58. That is, the content of printing setting table 61 is initialized to a predetermined value.

[View Display Processing]

Figure 17:
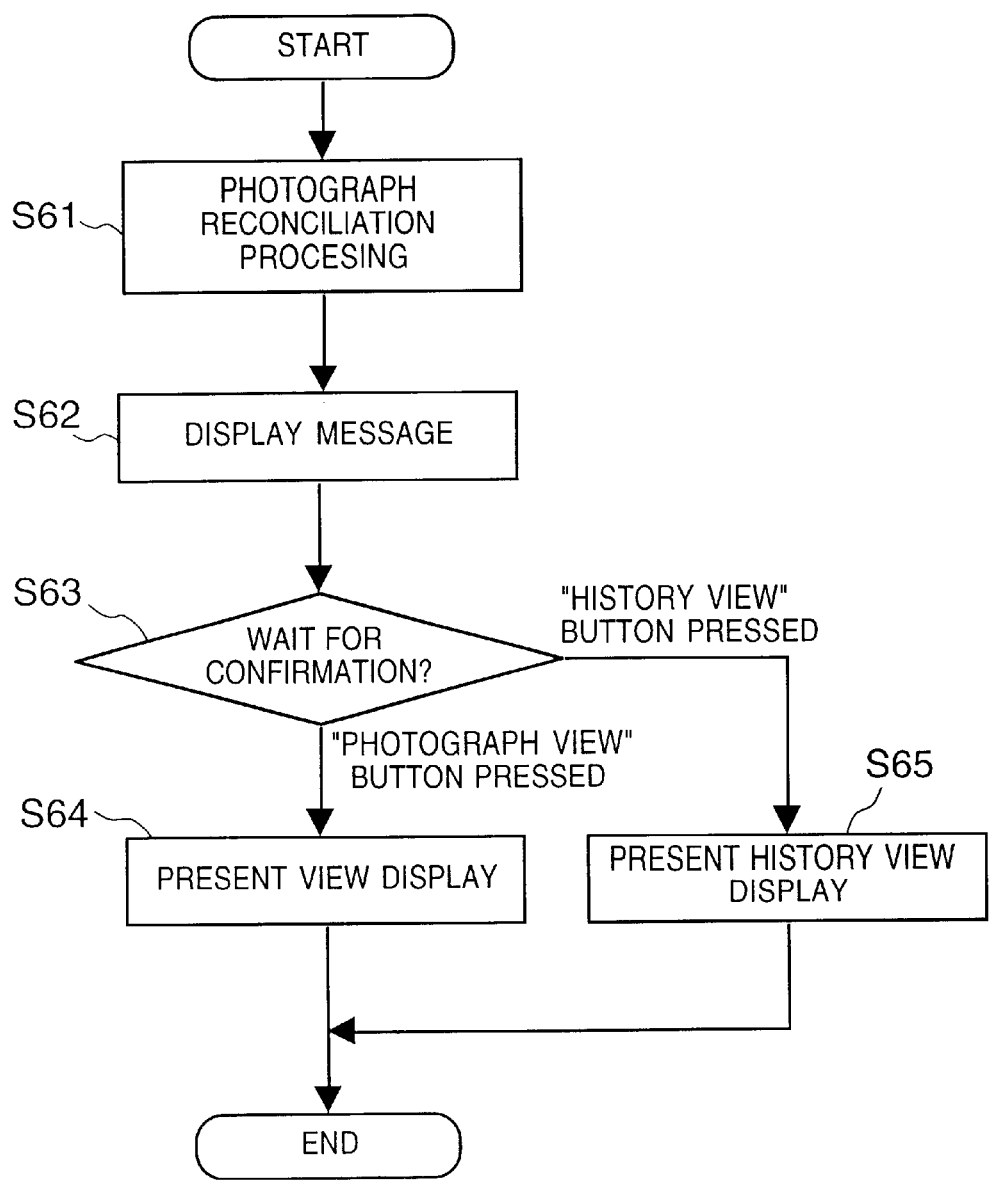
FIG. 17 is a flowchart illustrating processing for presenting a view display in the second embodiment.

Processing for displaying a view of photography files contained in the external card 51 in the second embodiment entails making the processing of step S38 in FIG. 10 described in connection with the first embodiment conform to a case where a plurality of the auxiliary information files 501 exist. The details of view display processing according to the second embodiment will be described with reference to the flowchart of FIG. 17.

In a case where a photograph that has been stored in the auxiliary information file 501 or auxiliary information history file 503 is not the proper photograph, photograph reconciliation processing for effecting a correction to the proper state is executed at step S61. More specifically, in regard to "photograph number" that has been stored in the auxiliary information file 501 and auxiliary information history file 503, the "photography date" of this photograph and photography date information possessed by the photograph file 500 that corresponds to this photograph number are compared. If the two do not match, then it is judged that the photograph file 500 is an improper photograph, namely a photograph different from the photograph being managed by the auxiliary information file 501. In this case, therefore, the corresponding auxiliary information file 501 or auxiliary information history file 503 is deleted, the content of the index file 504 that corresponds to the "index number" and "index item number" in this file is set to "0" and control proceeds to step S62.

A message calling for operation by the user is displayed at step S62. Either "photograph view" or "history view" can be selected as the view display in the second embodiment. Accordingly, a message prompting selection, i.e., a message to the effect "PRESS 'PHOTOGRAPH VIEW' BUTTON OR 'HISTORY VIEW' BUTTON", is displayed on the display unit 2 and control proceeds to step S63.

At step S63 the apparatus waits for confirmation, i.e., waits for a response to the operation that the operator was prompted to perform. More specifically, if the user presses the "photograph view" button on the instruction input unit 1, control proceeds to step S64, where a view of the photograph files present in the external card 51 is displayed. It should be noted that the view display processing of step S64 is similar to that of step S38 in FIG. 10 of the first embodiment and need not be described again. If the "history view" button is pressed, control proceeds to step S65.

A view of the history content of the auxiliary information file 501 in external card 51 is displayed on the display unit 2 at step S65. That is, as shown in FIG. 18, a view of "latest printing date", "layout name" and "paper name", etc., is displayed on the display unit 2 for every index item in index file 504. Here "latest printing date" is "printing date −1", which is one earlier than the unused "printing date i" that appeared first, among "printing date 1" through "printing date n" in the index item shown in FIG. 14. If all printing date areas are in use, then "latest printing date" is "printing date n". Further, "layout number" and "paper number" are obtained from the content of the auxiliary information history file linked by "auxiliary information history file name" of the index item, and the corresponding "layout name" and "paper name" are obtained from the paper information table 41. It should be noted that "layout name" and "paper name" are each retained in "page layout position information" and "view display information" in paper information table 41.

[Other Function Processing]

In the second embodiment, other processing at step S97 shown in FIG. 8 of the first embodiment includes processing conforming to a case where a plurality of the auxiliary information files 501 exist. The details of processing concerning these other functions in the second embodiment will be described with reference to the flowchart of FIG. 19.

Function selection processing is executed at step S71. That is, the type of button pressed at the instruction input unit 1 is discriminated. If it is found that a "clear" button has been pressed, control proceeds to step S73. On the other hand, if it is found that a function button other than this button has been pressed, then control proceeds to step S72, processing for this other function is executed and the processing shown in FIG. 19 is terminated.

In a case where a "select" button for selecting an item at the time of the history view display is pressed, the processing executed at step S72 is processing for duplicating the content of the auxiliary information file 501, which corresponds to the selected history item, in the printing setting table 61, and processing for setting, at the same time that "photograph number" is set, the photography date that has been stored in the photograph file 500 corresponding to this photograph number.

If the "clear" button has been pressed, a message calling for the user to perform an operation is displayed at step S73. That is, a message such as "LOAD EXTERNAL CARD" is displayed on the display unit 2 to prompt the user to load the external card 51 storing the auxiliary information file 501 or index file 504 desired to be cleared into the external memory drive 5.

At step S74 the apparatus waits for confirmation, i.e., waits for a response to the operation that the operator was prompted to perform. More specifically, if the user presses the "execute" button on the instruction input unit 1, the CPU judges that a "true" response has been sent back in response to the prompted operation and construes that the external card 51 has been loaded in the external memory drive 5. Control then proceeds to step S75. On the other hand, if the user presses the "cancel" key on the instruction input unit 1, the CPU judges that a "false" response has been sent back in response to the prompted operation, cancels the entry resulting from pressing of the "clear" button and terminates the processing shown in FIG. 19. It is determined at step S75 whether the external card 51 is usable in the external memory drive 5. More specifically, it is determined whether the external card 51 has been loaded in the external memory drive 5 and, if the card has been loaded, it is determined whether the external card 51 has a format that can be used. If the external card 51 has not been loaded, control returns to step S73 and the user is again prompted to load the external card 51. If the card cannot be used even though it has been loaded, control returns to step S73 and an error message to the effect "CARD DOES NOT HAVE USABLE FORMAT" is reported to the user. If the external card 51 is usable, however, control proceeds to step S76.

The auxiliary information history files 503 and index files 504 are deleted (cleared) from the external card 51 at step S76. More specifically, all index files 504 and auxiliary information history files 503 present in the loaded external card 51 are deleted, "index number" and "index item number" in the auxiliary information file 501 and in the printing setting table 61 in RAM 6 are set to "0" and the processing of FIG. 19 is terminated.

In accordance with the second embodiment, as described above, the external card 51 is provided with a plurality of the auxiliary information history files 503 and index files 504 in addition to the auxiliary information file 501, thereby making it possible to manage a plurality of items of printing information in a single external card. Accordingly, it is possible to select a desired single item of printing information from a plurality items thereof in the external card 51 and to perform printing based upon the printing information selected.

<Third Embodiment>

A third embodiment of the present invention will now be described.

In the first embodiment, an example in which the auxiliary information file 501 in external card 51 is updated at all times is described. In the third embodiment, an example in which the auxiliary information file 501 is not allowed to be changed will be described. The construction of the image processing apparatus in the third embodiment is the same as that of the first embodiment and need not be described again.

Figure 20:
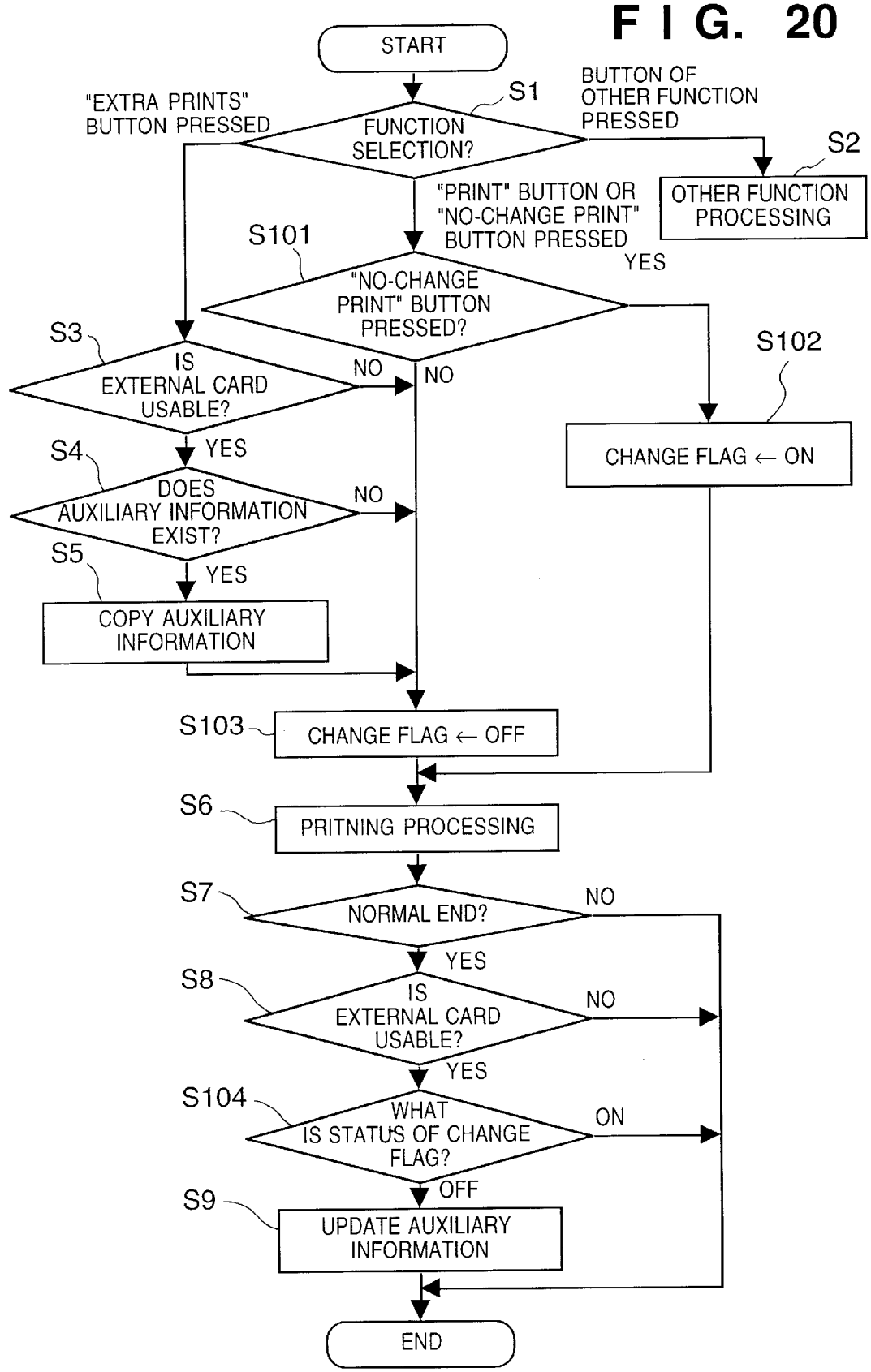
FIG. 20 is a flowchart illustrating printing processing in the third embodiment.

FIG. 20 is a flowchart illustrating printing processing according to the third embodiment. Processing steps identical with those in FIG. 2 according to the first embodiment are designated by like step numbers and are not described again. The operation that characterizes the third embodiment will be described.

The type of button pressed on the instruction input unit 1 is discriminated at step S1 in FIG. 20. Control proceeds to step S101 if the "print button" or a "no-change print" button has been pressed. It is determined at step S101 whether the pressed button is the "no-change print" button. If the answer is "YES", control proceeds to step S102. Here a change flag in RAM 6 is turned "on" in order to inhibit processing which updates the auxiliary information file 501 after printing. Control then proceeds to step S6.

If it is found at step S101 that the "print" button has been pressed ("NO" at step S101), or if the "extra prints" button has been pressed but the external card 51 has not been loaded, or if the auxiliary information file 501 does not exist in the external card 51, control proceeds to step S103. Here the change flag in RAM 6 is turned "off" in order to allow processing for updating the auxiliary information file 501 after printing. Control then proceeds to step S6.

Before the auxiliary information file 501 is updated following the completion of printing processing, it is determined at step S104 whether the auxiliary information file 501 should be updated or not. That is, whether the change flag in RAM 6 is "on" or "off" is examined. If the flag is "off", then updating of the auxiliary information file 501 is required and control proceeds to step S8, where update processing is executed. If the flag is "on", then updating of the auxiliary information file 501 is not required and, hence, the processing shown in FIG. 20 is terminated.

In accordance with the third embodiment, as described above, it is possible to arrange it so that the auxiliary information file 501 in external card 51 is not allowed to be changed. This makes it possible to avoid a situation in which the auxiliary information file 501 is changed by an erroneous operation.

<Fourth Embodiment>

A fourth embodiment according to the present invention will now be described.

In the first embodiment described above, an example is described in which the auxiliary information file 501 in external card 51 is provided with a "photograph effect number" item and the corresponding photograph file is subjected to prescribed effect processing. In the fourth embodiment, an example in which the auxiliary information file 501 is further provided with a "red-eye correction information" item will be described.

The "red-eye" effect is a phenomenon in which the pupil of the eye appears unnaturally red in a photographic image of a human being when the photograph is taken using a flash. It is caused by the effect of light reflected from the capillaries of the retina via the pupil. It is desired that some correction be applied when the red-eye effect appears in a photographic image. Accordingly, the fourth embodiment is characterized in that the auxiliary information file 501 is provided with red-eye correction information, red-eye correction processing is executed based upon the red-eye correction information when extra prints are made and the result of this processing is printed out. The construction of the image processing apparatus in the third embodiment is the same as that of the first embodiment and need not be described again.

[Composition of Printing Setting Table]

Figure 21:
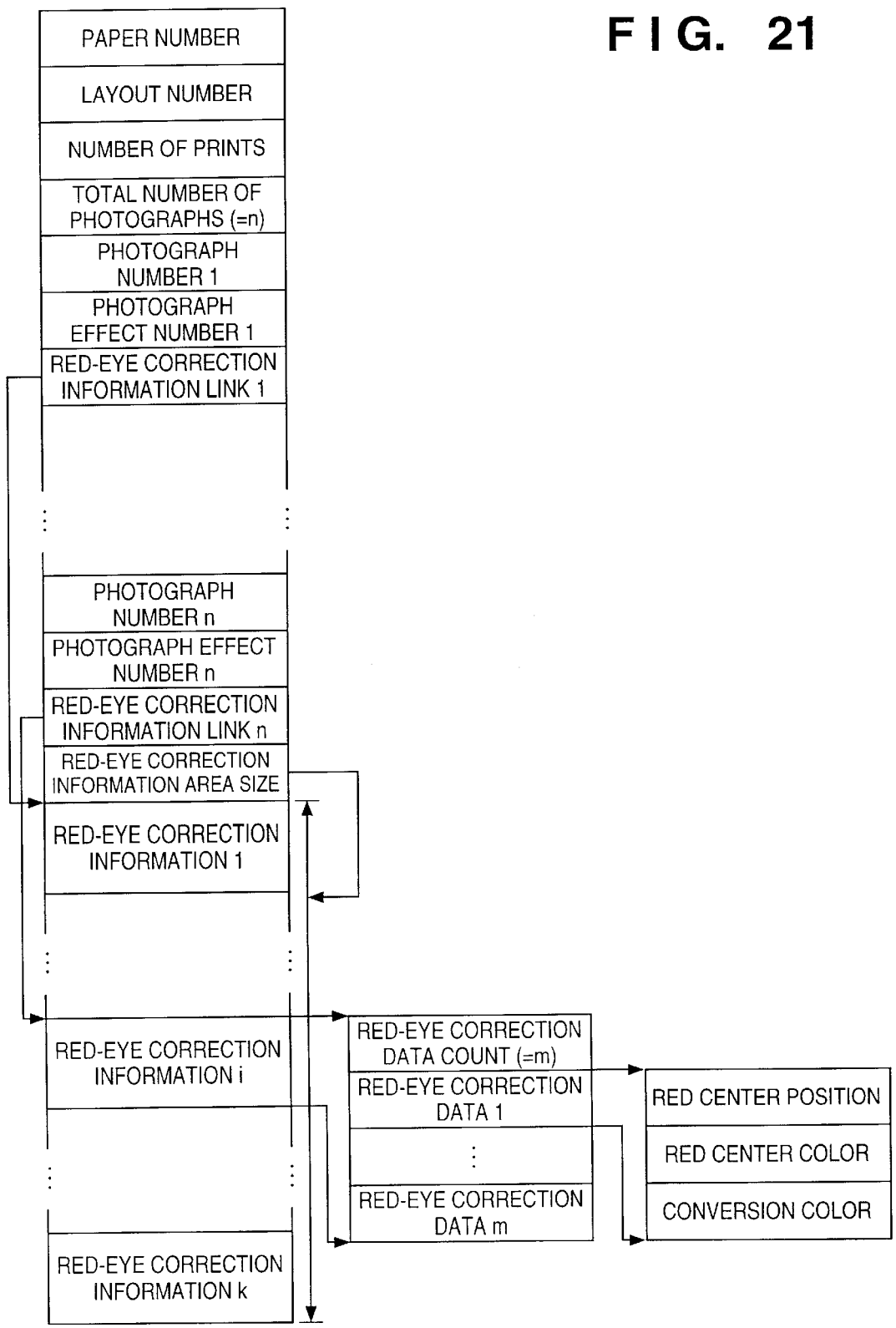
FIG. 21 is a diagram showing an example of the composition of a printing setting file in the fourth embodiment.

The printing setting table 61 according to the fourth embodiment is illustrated in FIG. 21. As shown in FIG. 21, a "red-eye correction information link" item is provided, in addition to "photograph number" and "photograph effect number", for each photograph. Further, a red-eye correction information area is provided at the end of the printing setting table 61, and the size of this area is managed by "red-eye correction information area size" at the beginning of this area. The red-eye correction information area contains "red-eye correction information" for every photograph requiring it, and the leading address of this area is linked to the "red-eye correction information link" of the photograph.

The content of the "red-eye correction information" is composed of "red-eye correction data count", which manages the total number of items requiring the red-eye correction, and "red-eye correction data" the number of items of which is equivalent to the total number. Furthermore, "red-eye correction data" is composed of "red-eye center position", "red-eye center color" and "conversion color".

In the fourth embodiment, the setting of "red-eye correction information area size", "red-eye correction data count" and "red-eye correction data" is carried out at steps S85 and S86 in FIG. 22, described later. Since the red-eye correction information area is of variable length, the printing setting table 61 also has is adapted to have a variable length. Accordingly, the printing setting table 61 is provided with sufficient area in the direction of higher addresses.

When the content of printing setting table 61 is initialized, "red-eye correction information link" and "red-eye correction information area size" are each set to "0", for example, thereby declaring that this area is not significant.

The auxiliary information file 501 in the fourth embodiment also has a structure similar to that of the printing setting table 61.

[Red-eye Correction Processing]

Processing for red-eye correction according to the fourth embodiment is started by pressing a "red-eye correction" button on the instruction input unit 1. More specifically, red-eye correction processing in the fourth embodiment is included in the other processing of step S97 shown in FIG. 8 of the first embodiment. FIG. 22 is a flowchart illustrating red-eye correction processing according to the fourth embodiment. This will now be described.

When red-eye correction processing is executed, first the user selects the image to be printed. This is done after a view of the photograph images in external card 51 is displayed. Selecting the image causes a transition to an image editing screen for subjecting the selected image to various effect processing. With the selected image displayed on this display screen, the apparatus waits for an input from the user. If the user specifies a red-eye correction, control shifts to the red-eye correction processing shown in FIG. 22. Selecting an image from the view display and specifying editing on an image editing screen may be performed by any method and need not be described here.

Figure 22:
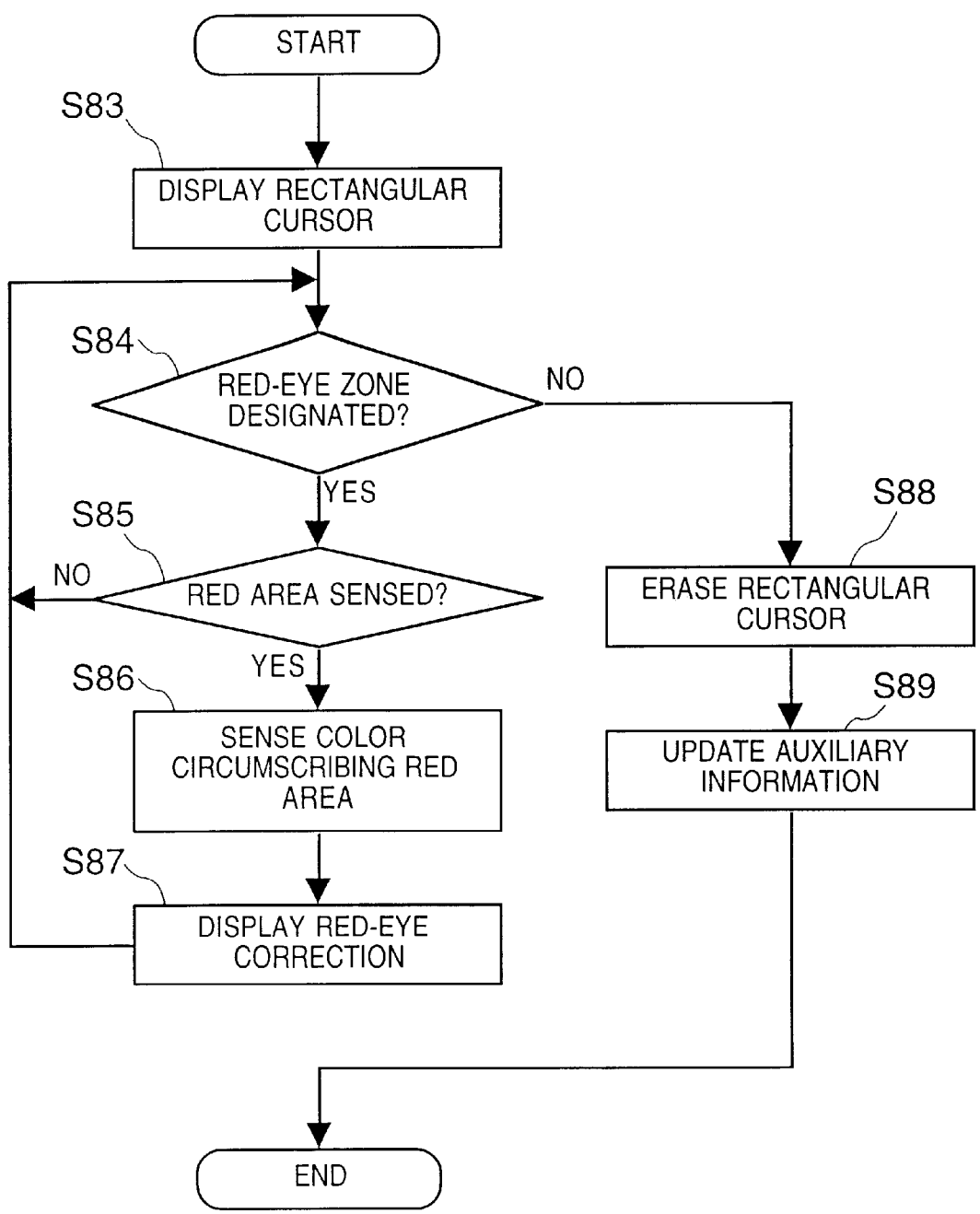
FIG. 22 is a flowchart illustrating red-eye correction processing according to the fourth embodiment.
Figure 23A:
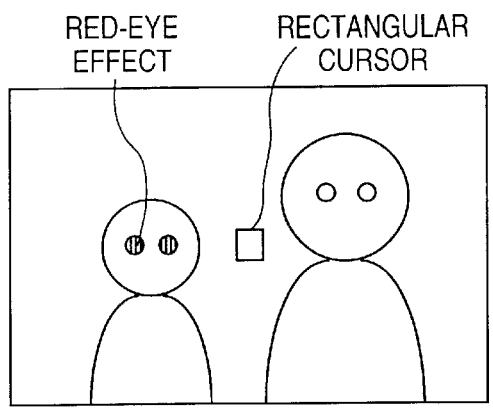
FIGS. 23A to 23D are diagrams useful in describing red-eye correction processing according to the fourth embodiment.

Thus, the processing shown in FIG. 22 is started by pressing the "red-eye correction" button on the instruction input unit 1, as described above. A rectangular cursor is displayed at the center of the image editing screen at step S83 in order to specify the limits of an area (referred to as the "red-eye zone" which includes a red eye to be corrected on the photograph image. An example of this is shown in FIG. 23A. The small rectangle at the center indicates the rectangular cursor, and the two small, black circles situated on the left side of the cursor indicate a pair of eyes exhibiting the red-eye effect in a photograph.

Figure 23B:
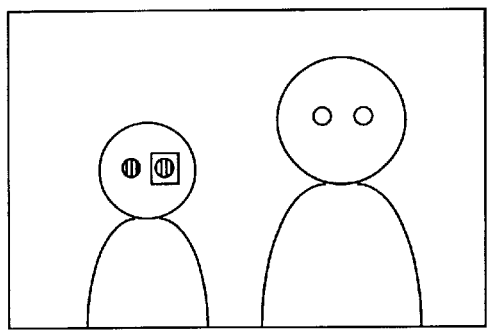

Next, the user designates the red-eye zone by the rectangular cursor at step S84. An example of this is shown in FIG. 23B. More specifically, by employing up, down, left, right arrow buttons on the instruction input unit 1, the user positions the rectangular cursor so as to encompass the target red eye. If the user then presses the "execute" button, the apparatus judges that the red-eye zone has been designated. Control then proceeds to step S85.

At step S85 the apparatus searches for the actual red eye, namely the area (referred to as the "red area" below) that actually appears red, in the designated red-eye zone. Processing for searching for the red area in the red-eye zone will be described in detail with reference to FIG. 24.

Figure 24:
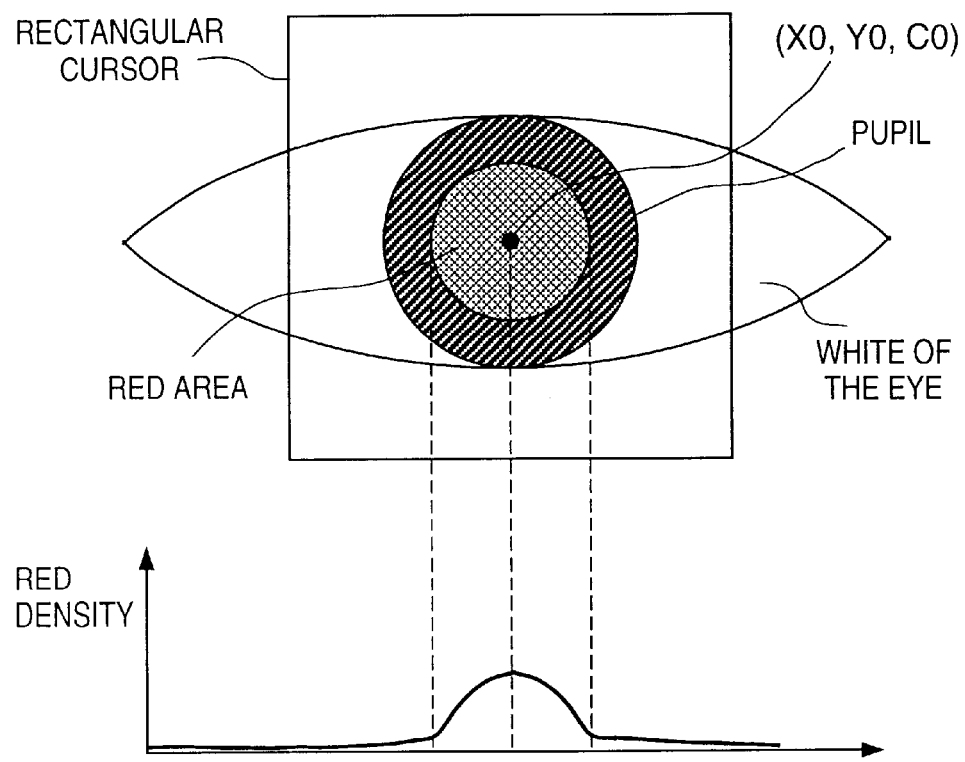
FIG. 24 is a diagram useful in describing red-eye correction processing according to the fourth embodiment.

FIG. 24 schematically illustrates, in enlarged form, the portion of an eye designated by the rectangular cursor in FIG. 23B. In accordance with FIG. 24, the eye comprises a white-of-the-eye portion and a pupil portion. It will be understood that the area corresponding to the pupil in the pupil portion is the actual red area. In the red-eye zone specified by the rectangular cursor, the center position (X0,Y0) of the red area and the center color (CO) are sensed based upon a red density distribution of pixels shown at the bottom of FIG. 24.

After the sensing operation, reference is had to the "red-eye correction information link" item of the relevant photograph image in the printing setting table 61 of FIG. 21. If the content is "0", an area of "red-eye correction information" ("red-eye correction data count" and one item of "red-eye correction data) is acquired anew and the size thus newly acquired is added to "red-eye correction information area size".

If the content of the "red-eye correction information link" is not "0", on the other hand, it is judged whether the area is situated at the end of the red-eye correction information area with respect to the red-eye correction information" indicated by "red-eye correction information link". This can be judged based upon "red-eye correction information area size" and the leading address of the red-eye correction information area in printing setting table 61, the leading address of "red-eye correction information" that is the link destination indicated by the "red-eye correction information link", and "red-eye correction data count" of this "red-eye correction information". If it is judged that this "red-eye correction information" is situated at the end of the red-eye correction information area, then new "red-eye correction data" is further acquired at the tail end, the size newly acquired is added to "red-eye correction information area size" and the "red-eye correction data count" is incremented. If it is judged that this "red-eye correction information" is not situated at the end of the red-eye correction information area, on the other hand, then, in order to further insert one size of "red-eye correction data" at the address obtained by the computation ("red-eye correction information link")+ ("red-eye correction data count")×("red-eye correction data size"), first the red-eye correction information area is enlarged by one size from the address obtained by the above-mentioned calculation, then the newly inserted size is added to "red-eye correction information area size" and this "red-eye correction data count" is incremented.

With respect to a "red-eye correction data" area thus acquired, the information of the sensed center position and center color in the red area is set as "red center position" and "red center color", and control proceeds to step S86. In a case where the red area has not been sensed, this is construed as an error and control returns to step S86. Here the user is prompted to designate a red-eye zone again.

The color that circumscribes the red area is sensed at step S86. A method of sensing this color will now be described.

Figure 25A:
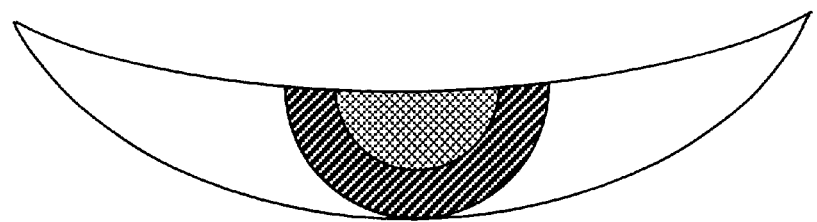
FIGS. 25A to 25C are diagrams useful in describing red-eye correction processing according to the fourth embodiment.
Figure 25B:
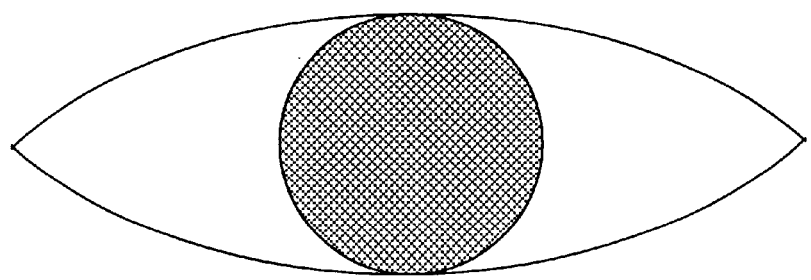
Figure 25C:
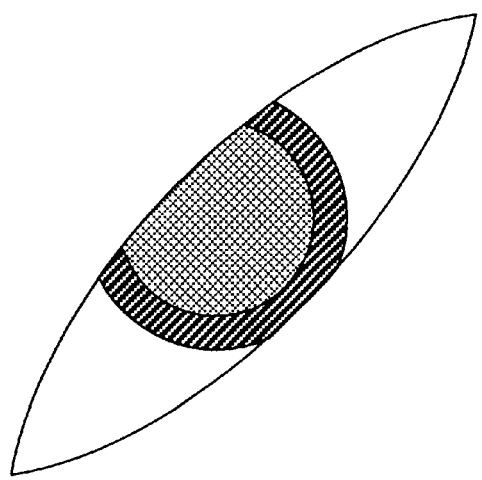

First, in an image in which an eye appears, the eye will not always appear in the ideal state shown in FIG. 24. The state of the red-eye effect that occurs, therefore, varies in dependence upon the circumstances of photography. For example, there is a state in which the eye is half closed, as shown in FIG. 25A, a state in which the red-eye portion contacts the white of the eye owing to the distance to the subject, as shown in FIG. 25B, and a state in which the center line of the eye is not parallel to the horizontal direction of the photograph because the subject has been photographed at an angle, for example, as illustrated in FIG. 25C.

Figure 26:
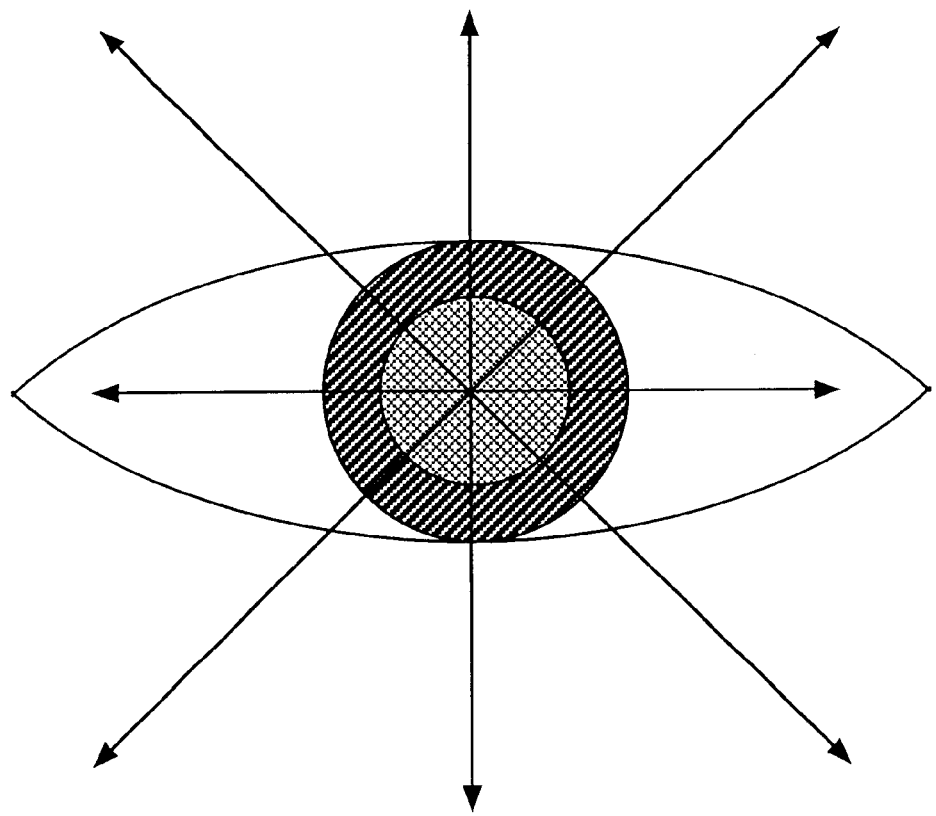
FIG. 26 is a diagram useful in describing red-eye correction processing according to the fourth embodiment.

For this reason, the color circumscribing the red area in the fourth embodiment is searched in eight directions at angular intervals of 45°, for example, about the red center position, as shown in FIG. 26. That is, the red density distribution of each pixel is obtained in a prescribed direction from the red center position (X0,Y0) and, on the basis of the color density distribution, a boundary color (C1) is sensed. The boundary color is the color of the pupil between the red area and the area of the white of the eye. This processing is executed successively for each of the above-mentioned eight directions. If at least one boundary color is obtained, the color having the highest frequency of occurrence among the boundary colors is obtained and adopted as the conversion color. This color is set as "conversion color" of "red-eye correction data" acquired at step S85. If even one boundary color is not obtained, on the other hand, a default color that has been stored in the SRAM 4 is set as the conversion color. The color used as the default color should be decided based upon information such as the country and region of sale stored when the apparatus is shipped from the factory, for example. It will suffice if the color used is the pupil color that predominates in the region of sale.

Figure 23C:
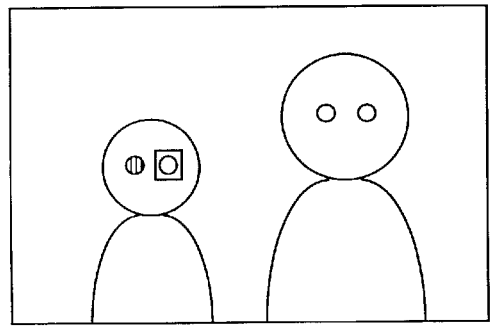

The photograph obtained by the red-eye correction is displayed again at step S87. That is, the red-eye correction is executed based upon "red color position", "red center color" and "conversion color" obtained at steps S85, S86, and the result of the correction is displayed, as shown in FIG. 23C. More specifically, first a portion having a color near the "red center color" is sensed in regard to the image in the vicinity of "red center position", and the range of detection is successively enlarged to obtain red area limits. The pixels within the red area limits thus obtained are replaced by pixels of the "conversion color", thereby correcting the color of the pupil to a natural pupil color. Thereafter the photograph obtained by the correction is displayed on the image editing screen again and control returns to step S84 to prompt the user to designate the next red-eye zone.

Figure 23D:
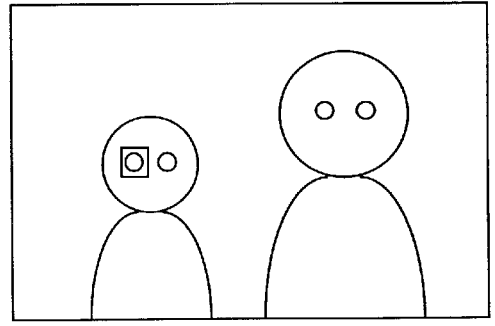

By thus repeating the processing of steps S84–S87 in regard to the image editing screen in the manner described above, it is possible to apply an appropriate correction to all red eyes that appear in a photograph image, as shown in FIG. 23D.

If all red-eye corrections have been completed, the user presses an "end" button at step S84. As a result, it is determined that red-eye correction processing has ended, control proceeds to step S88 and the rectangular cursor is erased. The content of the auxiliary information file 501 in external card 51 is then updated by the content of the printing setting table 61 at step S89 to end the red-eye correction processing shown in FIG. 22.

[Printing Processing after Red-eye Correction]

Processing in a case where a photographic image that has been subjected to red-eye correction processing in the manner set forth above is printed out will now be described.

In a manner similar to that of the first embodiment, the fourth embodiment also duplicates the content of the auxiliary information file 501 of external card 51 in the printing setting table 61 of RAM 6 by overwriting the table with the exception of "number of prints". This is to make the content of the last print settings effective when extra prints are made. This corresponds to auxiliary information duplication processing indicated at step S5 in FIG. 2 according to the first embodiment. That is, in "extra print" processing, which requires printing in a manner the same as last time, the red-eye correction information in external card 51 becomes effective. In ordinary "print" processing, however, it becomes possible to perform printing based upon the red-eye correction information newly set in the printing setting table 61.

Next, processing corresponding to the processing for creating print data indicated at step S6 in FIG. 2 begins. However, only processing that differs from that of the first embodiment will be described here.

When a photograph file is converted to print data in the fourth embodiment, effect processing indicated by "photograph effect number n" corresponding to "photograph number n" in printing setting table 61 is executed in a manner similar to that of the first embodiment. However, the fourth embodiment differs in that the red-eye correction processing is executed before this effect processing.

Red-eye correction processing at the time of printing involves first determining whether the content of "red-eye correction information link" of a photograph to be processed is "0" in the printing setting table 61. If the content is "0", the red-eye effect has not occurred and, hence, red-eye correction processing is not executed. If the content is not "0", on the other hand, then red-eye correction processing is required. Consequently, red-eye correction processing based upon "red-eye correction information" linked by the above-mentioned "red-eye correction information link" is executed. That is, red-eye correction processing is performed a number of times commensurate with "red-eye correction data count" on the basis of each item of "red-eye correction data" the number of items of which are commensurate with "red-eye correction data count" retained in the "red-eye correction information".

More specifically, in regard to a photographic image to be processed, it is determined for each item of "red-eye correction data" whether a pixel of "red center color" exists at "red center position". If such a pixel does not exist, i.e., if the photograph is taken again after it has been deleted, this corresponds to a case where a change has already been made. In this case, therefore, correction processing of this item of "red-eye correction data" is not executed and correction processing of the next item of "red-eye correction data" is performed. On the other hand, if a pixel of "red center color" exists at "red center position", then a portion having a color close to "red center color" is sensed in regard to an image in the vicinity of "red center position" and the range of detection is successively enlarged to obtain red area limits. The pixels within the red area limits thus obtained are replaced by pixels of the "conversion color", thereby correcting the color of the pupil to a natural pupil color. Correction processing based upon the next item of "red-eye correction data" is then executed. After red-eye correction processing corresponding to all items of "red-eye correction data" has thus been executed with respect to the image of a photograph, the image is printed out.

In accordance with the fourth embodiment, as described above, further setting red-eye correction information in the auxiliary information file 501 of external card 51 makes it possible to dispense with the need for repeating a troublesome setting operation that accompanies red-eye correction processing when processing for producing extra prints using the card is carried out.

[Other Embodiments]

A method through which an external card storing photograph files is read and written directly has been described in the foregoing embodiments. However, it goes without saying that the embodiments can be applied also to a system in which communication is performed with a digital still camera or the like by serial bidirectional communication, for example, and the content of an external card in the digital still camera is read and written through such communication.

Further, the embodiments described above deal with an example in which photograph files retained in an external card are printed out. However, the present invention is not limited to photograph images. The present invention is applicable if the image processing apparatus is one which processes data stored on an external storage medium capable of being loaded in an unloaded from an external storage device. That is, it will suffice if detailed information relating to data stored on an external storage medium is capable of being stored and updated on the external storage medium in similar fashion.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

In accordance with the present invention, as described above, image data and printing information relating to printing of this image data are stored together in storage means, whereby printing information used the last time printing was performed can be made the effective information when the image data is printed.

Furthermore, by storing both image data and printing paper information in storage means and making it possible to provide printing paper information anew, it is possible to perform printing properly even on printing paper of a type not available as a candidate in the apparatus.

What is claimed is:

1. An image processing apparatus comprising:

printing means for printing out image data based upon printing information that has been set;

an access unit for accessing to an image information holding means for holding image data and auxiliary information comprising printing information relating to this image data;

control means for performing control in such a manner that the auxiliary information is referred to as the printing information when image data held by the image information holding means is printed out by said printing means;

printing information holding means for holding the printing information; and designating means for applying a print designation to said printing means, wherein said control means copies contents of the auxiliary information to the printing information held by the printing information holding means when image data held by the image information holding means is printed out by said printing means, and said control means controls, in dependence upon content of the print designation, whether or not content of the auxiliary information is copied to the printing information held by said printing information holding means.

2. The apparatus according to claim 1, wherein said control means copies contents of the printing information to the auxiliary information after the image data held by the image information holding means is printed out by said printing means.

3. The apparatus according to claim 1, wherein, if the auxiliary information is not being held by the image information holding means when the image data held by the image information holding means is printed out by said printing means, said control means performs control in such a manner that printing is performed based upon the printing information held by the printing information holding means.

4. The apparatus according to claim 1, wherein the auxiliary information has a format identical with that of the printing information.

5. The apparatus according to claim 1, wherein the image information holding means hold a plurality of items of image data.

6. The apparatus according to claim 5, wherein the image data held by the image information holding means is photograph image data.

7. The apparatus according to claim 1, wherein said control means copies contents of the auxiliary information in regard to information other than information indicating number of printed copies contained in the printing information.

8. The apparatus according to claim 1, wherein the image information holding means is a non-volatile storage device.

9. The apparatus according to claim 8, wherein the image information holding means is a removable external storage device.

10. The apparatus according to claim 9, wherein the image information holding means is card-type storage device.

11. The apparatus according to claim 1, further comprising paper information holding means for holding, as first paper information, a plurality of items of printing-paper type information indicating types of printing paper handled by said printing means, and a plurality of items of printing control information regarding said printing paper, wherein said control means performs control in such a manner that printing is performed based upon the first paper information, which is specified by the auxiliary information, when the image data held by the image information holding means is printed out by said printing means.

12. The apparatus according to claim 11, wherein the image information holding means further holds, as second paper information, printing-paper type information indicating types of printing paper handled by said printing means, and printing control information regarding said printing paper; and said control means causes the second paper information to be held by the image information holding means in a case where the plurality of items of first paper information are all different from the second paper information.

13. The apparatus according to claim 12, wherein the first and second paper information each have version information; and said control means compares the version information of the first paper information and the version information of the second paper information if the first paper information is the same as the second paper information, and replaces older version information by newer version information.

14. The apparatus according to claim 11, wherein said control means causes the first paper information to which reference has been made to be held by the image information holding means after the image data held by the image information holding means has been printed out by said printing means.

15. The apparatus according to claim 12, wherein said control means replaces the first paper information to which reference has been made by the second paper information after the image data held by the image information holding means has been printed out by said printing means.

16. The apparatus according to claim 11, wherein said control means provides updating information in a case where the first paper information has been updated.

17. The apparatus according to claim 12, wherein the first and second paper information each include layout information.

18. The apparatus according to claim 11, further comprising designating means for designating updating of the first paper information.

19. The apparatus according to claim 12, further comprising:

display means for displaying the image data held by the image information holding means; and designating means for issuing a display designation to display, on said display means, the image data held by the image information holding means, wherein said control means updates the first or second paper information when a display based upon the display designation is presented.

20. The apparatus according to claim 1, wherein the image information holding means holds a plurality of items of the auxiliary information as well as management information for managing the plurality of items of auxiliary information.

21. The apparatus according to claim 20, wherein the plurality of items of auxiliary information each have a different history.

22. The apparatus according to claim 21, wherein the printing information includes history information representing the history thereof.

23. The apparatus according to claim 20, wherein the management information includes date information representing a date on which printing based upon the auxiliary information was performed.

24. The apparatus according to claim 23, wherein the image data held by the image information holding means includes photography date information representing photography date of the image data, and the auxiliary information also includes said photography date information.

25. The apparatus according to claim 24, wherein said control means deletes the auxiliary information in a case where the photography date of the image data and the photography date held in the auxiliary information differ.

26. The apparatus according to claim 20, further comprising display means for displaying management information held by the image information holding means.

27. The apparatus according to claim 20, further comprising deletion-designating means for designating deletion of the management information, wherein said control means deletes the management information in response to the designation by said deletion-designating means.

28. The apparatus according to claim 2, further comprising non-update designating means for designating that updating of the auxiliary information is not allowed,
wherein said control means does not perform updating of the auxiliary information in response to the designation by said non-update designating means not allowing updating.

29. The apparatus according to claim 1, wherein the printing information includes red-eye correction information for subjecting the image data to a red-eye correction.

30. The apparatus according to claim 29, wherein the red-eye correction information includes color information before correction, color information after correction and correction position information.

31. The apparatus according to claim 30, further comprising setting means for displaying the image data and setting red-eye correction information on a display screen.

32. A method of controlling an image processing apparatus having printing information holding means for holding printing information that has been set, printing means for printing out image data based upon the printing information, and an access unit for accessing image information holding means for holding the image data and auxiliary information comprising printing information relating to this image data, said method comprising:
a designating step, of designating printing of the image data;
a first copying step, of copying content of the auxiliary information to the printing information held by the printing information holding means when image data held by the image information holding means is printed out using the printing means;
a printing step, of printing out the image data using the printing means, based upon the printing information; and
a control step, of controlling, in dependence upon content of the print designation made in said designating step, whether or not contents of the auxiliary information is copied to the printing information held by the image information holding means.

33. The method according to claim 32, wherein said first copying step is executed in a case where printing identical with an immediately preceding printing operation is designated in said designating step.

34. The method according to claim 33, further comprising a determining step, of determining whether the auxiliary information is being held by the image information holding means,
wherein said first copying step is executed if the auxiliary information is being held by the image information holding means.

35. The method according to claim 34, further comprising a second copying step, of copying content of the printing information to the auxiliary information after said printing step is executed.

36. The method according to claim 35, wherein the image processing apparatus further includes paper information holding means for holding, as first paper information, a plurality of items of printing-paper type information indicating types of printing paper handled by the printing means, and a plurality of items of printing control information regarding the printing paper; and
the image information holding means holds, as second paper information, printing-paper type information indicating types of printing paper handled by the printing means, and printing control information regarding the printing paper,
said method further comprising a registration step, of registering the second paper information in the paper information holding means in a case where the plurality of items of first paper information are all different from the second paper information.

37. An image processing system comprising:
a printing apparatus for printing out image data based upon printing information that has been set;
an access unit for accessing to a storage device for holding the image data and auxiliary information comprising printing information relating to this image data; and
a control unit for performing control in such a manner that the auxiliary information is referred to as the printing information when image data held by the storage device is printed out by said printing apparatus;
printing information holding means for holding the printing information; and
designating means for applying a print designation to said printing apparatus,
wherein said control unit copies contents of the auxiliary information to the printing information held by said printing information holding means when image data held by the storage device is printed out by said printing apparatus, and
wherein said control means controls, in dependence upon contents of the print designation, whether or not contents of the auxiliary information is copied to the printing information held by said printing information holding means.

38. The system according to claim 37, wherein said control unit copies contents of the printing information to the auxiliary information after the image data held by the storage device is printed out by said printing apparatus.

39. The system according to claim 37, wherein, if the auxiliary information is not being held by the storage device when the image data held by the storage device is printed out by said printing apparatus, said control unit performs control in such a manner that printing is performed based upon the printing information held by said printing information holding means.

40. The system according to claim 39, wherein said control unit further has paper information holding means for holding, as first paper information, a plurality of items of printing-paper type information indicating types of printing paper handled by said printing apparatus, and a plurality of items of printing control information regarding the printing paper,
said storage device further holds, as second paper information, printing-paper type information indicating types of printing paper handled by said printing apparatus, and printing control information regarding the printing paper, and
said control unit causes the second paper information to be held by said paper information holding means in a case where the plurality of items of first paper information are all different from the second paper information.

41. A storage medium storing control program code of an image processing apparatus having printing information holding means for holding printing information that has been set, printing means for printing out image data based upon the printing information, and an access unit for accessing to image information holding means for holding the image data and auxiliary information comprising printing information relating to this image data, said program code comprising:

code of a designating step, of designating printing of the image data;

code of a copying step, of copying contents of the auxiliary information to the printing information held by the printing information holding means when image data held by the image information holding means is printed out using the printing means;

code of a printing step, of printing out the image data using the printing means, based upon the printing information; and code of a control step, of controlling, in dependence upon contents of the print designation made in said designating step, whether or not content of the auxiliary information is copied to the printing information held by the image information holding means.

42. An image processing apparatus comprising:

printing means for printing out image data based upon printing information that has been set;

an access unit for accessing to an image information holding means for holding image data and auxiliary information comprising printing information relating to this image data;

control means for performing control in such a manner that the auxiliary information is referred to as the printing information when image data held by the image information holding means is printed out by said printing means;

printing information holding means for holding the printing information; and designating means for applying a print designation to said printing means, wherein said control means copies contents of the auxiliary information to the printing information holding means when image data held by said image information holding means is printed out by said printing means, and said control means controls in such a manner that said printing means refers contents of the print designation and copied auxiliary information, excluding such contents as may correspond to the contents of the print designation, when said printing means prints the image data.

43. An image processing method comprising the steps of:

printing out image data, using a printing means, based upon printing information that has been set;

accessing to an image information holding means for holding image data and auxiliary information comprising printing information relating to this image data;

controlling in such a manner that the auxiliary information is referred to as the printing information when image data held by the image information holding means is printed out;

holding the printing information in a printing information holding means; and applying a print designation to the printing means, wherein said controlling step includes copying contents of the auxiliary information to the printing information holding means when image data held by the image information holding means is printed out by the printing means, and includes controlling in such a manner that the printing means refers contents of the print designation and copied auxiliary information, excluding such contents as may correspond to the contents of the print designation, when the printing means prints the image data.

44. The image processing apparatus according to claim 42, wherein said control means copies contents of the printing information to the auxiliary information after the image data held by the image information holding means is printed out by said printing means.

45. The apparatus according to claim 42, wherein, if the auxiliary information is not being held by the image information holding means when the image data held by the image information holding means is printed out by said printing means, said control means performs control in such a manner that printing is performed based upon the printing information held by the printing information holding means.

46. The apparatus according to claim 42, wherein the auxiliary information has a format identical with that of the printing information.

47. The apparatus according to claim 42, wherein said apparatus comprises said image information holding means, and wherein said image information holding means is a removable external storage device.

48. The image processing method according to claim 43, wherein said controlling step includes copying contents of the printing information to the auxiliary information after the image data held by the image information holding means is printed out by the printing means.

49. The method according to claim 43, wherein, if the auxiliary information is not being held by the image information holding means when the image data held by the image information holding means is printed out by the printing means, said controlling step includes performing control in such a manner that printing is performed based upon the printing information held by the printing information holding means.

50. The method according to claim 43, wherein the auxiliary information has a format identical with that of the printing information.

51. The method according to claim 43, wherein the image information holding means is a removable external storage device.

* * * * *